US011488055B2

(12) United States Patent
Kumar et al.

(10) Patent No.: US 11,488,055 B2
(45) Date of Patent: Nov. 1, 2022

(54) TRAINING CORPUS REFINEMENT AND INCREMENTAL UPDATING

(71) Applicant: INTERNATIONAL BUSINESS MACHINES CORPORATION, Armonk, NY (US)

(72) Inventors: Prashant Kumar, Bhagalpur (IN); John Vaughan, Williamsburg, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1048 days.

(21) Appl. No.: 16/046,512

(22) Filed: Jul. 26, 2018

(65) Prior Publication Data

US 2020/0034749 A1    Jan. 30, 2020

(51) Int. Cl.
*G06N 20/00* (2019.01)
*G06N 5/04* (2006.01)
*G06F 16/93* (2019.01)
*G06F 16/2457* (2019.01)

(52) U.S. Cl.
CPC ....... *G06N 20/00* (2019.01); *G06F 16/24578* (2019.01); *G06F 16/93* (2019.01); *G06N 5/04* (2013.01)

(58) Field of Classification Search
CPC .......... G06N 20/00; G06N 5/04; G06N 3/006; G06N 5/045; G06F 16/93; G06F 16/24578; G06F 16/35; G06F 16/36
See application file for complete search history.

(56) References Cited

U.S. PATENT DOCUMENTS

| 2004/0148170 | A1 | 7/2004 | Acero | |
|---|---|---|---|---|
| 2005/0027664 | A1 | 2/2005 | Johnson et al. | |
| 2007/0073534 | A1* | 3/2007 | Guo | G06F 16/36 704/9 |
| 2010/0293451 | A1 | 11/2010 | Carus | |

(Continued)

FOREIGN PATENT DOCUMENTS

| CN | 107609113 A | 1/2018 | |
|---|---|---|---|
| WO | WO-2018236674 A1 * | 12/2018 | ............... G06N 5/02 |

OTHER PUBLICATIONS

Lai Siwei et al., "Recurrent Convolutional Neural Networks for Text Classification", Proceedings of the Twenty-Ninth AAAI Conference on Artificial Intelligence, 2015, 7 pgs.

(Continued)

*Primary Examiner* — Brent Johnston Hoover
(74) *Attorney, Agent, or Firm* — Brian Restauro; Matthew M. Hulihan; Heslin Rothenberg Farley & Mesiti PC

(57) ABSTRACT

Training corpus refinement and incremental updating includes obtaining a training corpus having training samples, refining the training corpus to produce a refined training corpus of data, by applying to the training corpus overlap and noise reduction treatments, maintaining an incremental intelligence database based on filtered user feedback and having candidate feedback training samples to augment the refined training corpus, controlling integration of the candidate feedback training samples with the refined training corpus, and augmenting the refined training corpus with at least some of the candidate feedback training samples to produce an augmented training corpus.

20 Claims, 13 Drawing Sheets

(56) References Cited

U.S. PATENT DOCUMENTS

| | | | |
|---|---|---|---|
| 2011/0251989 A1* | 10/2011 | Kraaij | G06F 16/353 |
| | | | 706/50 |
| 2013/0173258 A1* | 7/2013 | Liu | G06F 40/40 |
| | | | 704/9 |
| 2013/0246046 A1* | 9/2013 | Fan | G06F 40/30 |
| | | | 704/9 |
| 2013/0339373 A1* | 12/2013 | Patton | G06F 16/90324 |
| | | | 707/749 |
| 2014/0279738 A1 | 9/2014 | Mahler et al. | |
| 2015/0254555 A1* | 9/2015 | Williams, Jr. | G06N 3/0454 |
| | | | 706/14 |
| 2017/0308790 A1 | 10/2017 | Nogueira Dos Santos et al. | |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

TRAINING CORPUS REFINEMENT AND INCREMENTAL UPDATING

BACKGROUND

Classifiers classify items using a classification model that is 'trained' using a collection of data points called a training corpus. It is desired that the training corpus used to train a classifier/classification model be accurate and complete to help ensure comprehensive and accurate classification of items such as text or natural language input.

SUMMARY

Shortcomings of the prior art are overcome and additional advantages are provided through the provision of a computer-implemented method. The method obtains a training corpus of data, the training corpus including a collection of training samples. The method refines the obtained training corpus to produce a refined training corpus of data, where refining the obtained training corpus includes applying to the obtained training corpus an overlap treatment and a noise reduction treatment, the overlap treatment and noise reduction treatment filtering out one or more samples of the collection of training samples. The method maintains an incremental intelligence database based on filtered user feedback, the incremental intelligence database storing candidate feedback training samples based on the filtered user feedback to augment the refined training corpus. The method controls integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus. The method also includes augmenting the refined training corpus with at least some of the candidate feedback training samples to produce an augmented training corpus.

Further, a computer program product including a computer readable storage medium readable by a processing circuit and storing instructions for execution by the processing circuit is provided for performing a method. The method obtains a training corpus of data, the training corpus including a collection of training samples. The method refines the obtained training corpus to produce a refined training corpus of data, where refining the obtained training corpus includes applying to the obtained training corpus an overlap treatment and a noise reduction treatment, the overlap treatment and noise reduction treatment filtering out one or more samples of the collection of training samples. The method maintains an incremental intelligence database based on filtered user feedback, the incremental intelligence database storing candidate feedback training samples based on the filtered user feedback to augment the refined training corpus. The method controls integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus. The method also includes augmenting the refined training corpus with at least some of the candidate feedback training samples to produce an augmented training corpus.

Yet further, a computer system is provided that includes a memory and a processor in communication with the memory, wherein the computer system is configured to perform a method. The method obtains a training corpus of data, the training corpus including a collection of training samples. The method refines the obtained training corpus to produce a refined training corpus of data, where refining the obtained training corpus includes applying to the obtained training corpus an overlap treatment and a noise reduction treatment, the overlap treatment and noise reduction treatment filtering out one or more samples of the collection of training samples. The method maintains an incremental intelligence database based on filtered user feedback, the incremental intelligence database storing candidate feedback training samples based on the filtered user feedback to augment the refined training corpus. The method controls integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus. The method also includes augmenting the refined training corpus with at least some of the candidate feedback training samples to produce an augmented training corpus.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
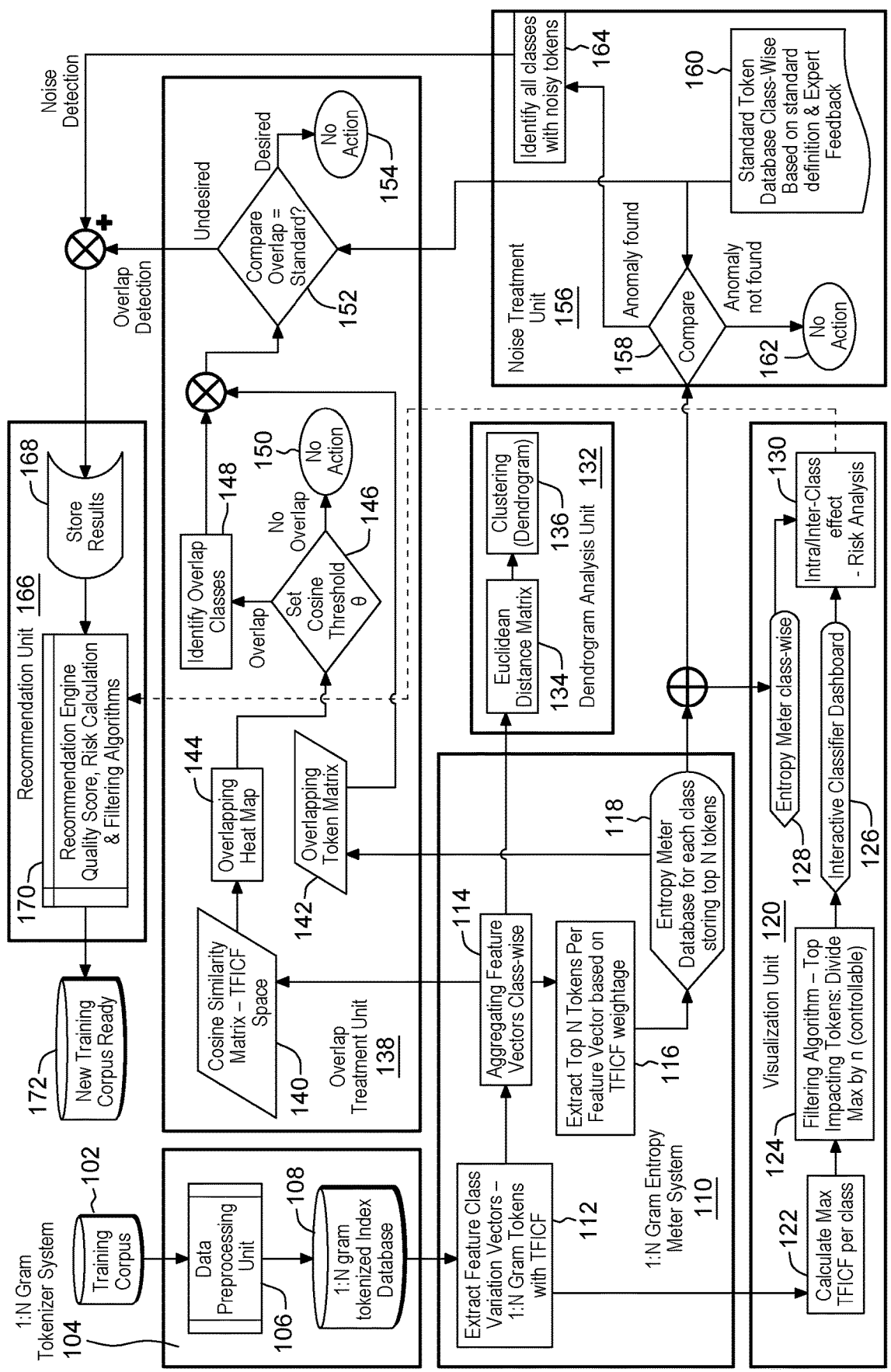
FIG. 1 depicts an example component diagram of a corpus advisor, in accordance with aspects described herein.

There exists no standard system and/or models available to advise how to strategically create a training corpus used for intent/context based text classification and add new variations (samples) based on user feedback. Manual training corpus modification and variation addition is time-consuming, iterative, error-prone, incomplete, and lacking quality assurance. Such manual training often results in a poor quality training corpus, while failing to provide insight into the impact of the added variations.

Incoming user feedback is stochastic in nature and commonly full of noise. Feedback systems used for text classification in particular are either manual or semi-automatic in nature and also lack control. These systems are prone to manual errors, resulting in compromises to classifier accuracy and wasted time from manual validation and testing.

Aspects described herein address issues associated with manual training. This is accomplished in part with artificial intelligence-based training, determining the quality (precision and recall) and risk associated with a training corpus, and taking specific measures to mitigate quality deficiencies and risk, thereby increasing accuracy of classifier(s) being trained with the training corpus.

Aspects also incorporate an autonomous (e.g. a fully autonomous) regenerative feedback mechanism to incrementally augment the training corpus using artificial intelligence, with the help of a control system. Based on annotation of classes represented in feedback, aspects learn how to add new variations received via user feedback and new/test documents (samples) into the training corpus through the use of aspects described herein.

Some approaches to corpus improvement involve statistical classifiers for spoken language understanding and command/control scenarios, interactive machine learning systems for automated annotation of information in text, and development of tools to process natural language text. However, none of these approaches incorporate a diagnostic machine learning model that informs of the quality of the training corpus, and inter-class effects and intra-class effects of the classification. Also, they tend to rely heavily on manual intervention and lack a capability of self-learning via an understanding of what happened in the past, looking into the training corpus, and allowing the system itself to incrementally augment the corpus with new intelligence from new variations (e.g. provided via feedback), in a controlled manner and that anticipates what can happen in the future by checking accuracy against a previous sample space.

Additionally, interactive machine learning systems for automated annotation of information in text can incorporate a basis feedback mechanism that lacks any robust algorithm and feedback filtering technique. The learning phase may still be driven using manual intervention at every junction, and therefore be prone to manual errors that result in poor text classification. The approach fails to enable the system to learn new intelligence in a controlled manner and that the system has not seen in the past but nevertheless is confirmed relevant to a particular intent or a new intent not currently represented in the corpus.

In text classification, reasons for low training corpus accuracy may be effects of inter-class overlap resulting in false negative cases and effects of intra-class noise resulting in false positive cases. False positive cases occur mainly due to noise, unrelated tokens/words present in the class, and whether the token has a higher importance weight in the training classifier, in which related incoming text is classified incorrectly. False negative cases occur mainly because of the overlap effect of some tokens between the classes i.e. inter-class overlap effect. However, in some cases, some amount of overlap is desirable and, in those cases, relative information (entropy) weight of the tokens with a highest impact for the corresponding classes can play an important role in accurate classification. In all such cases, it may be difficult for an individual to manually identify these, especially when the training corpus is large. Accordingly, aspects described herein address this and prove to be useful to refine and augment the training corpus strategically by way of a 'Corpus Advisor' disclosed herein, which, in turn, increase the accuracy of the classification model being trained with the corpus.

A self-learning, automated feedback artificial intelligence (AI) control system disclosed herein has the capability to understand the past (what happened using the Corpus Advisor), understand the present (what is coming from a feedback database and testing samples, using algorithms), and anticipate the future (what can happen using an AI control system) before making decisions about whether to augment the training corpus and therefore retrain a classification model (trained using the training corpus) for a text classification AI bot that leverages the model for text classification.

Aspects disclosed herein provide capabilities that can eliminate at least some the decision-making conventionally provided from subject matter experts (SME)s for feedback validation and for testing validation, as well as the testing analysis conventionally provided by Business Analysts (BA)s.

Advantageously provided by aspects disclosed herein are:

A powerful diagnosis machine learning model present in Corpus Advisor, that in some embodiments can diagnose a large training corpus within minutes, instead of the weeks or months it could conventionally take to refine the corpus to an equivalent level of performance. Some specialties of the diagnosis machine leaning model of the Corpus Advisor include: overlap detection and treatment (to identify undesirable overlapping effect in the training corpus and filter-out the applicable training samples); Anomaly detection and treatment (to identify undesirable anomalies present in the training corpus and filter-out the applicable training samples); entropy check (to check that information content of each class present in the corpus is exhaustive in nature); quality and risk analysis of the training corpus (to inform of the quality and risk associated with the training corpus); and a data visualization platform (to give an easy way to present and indicate insights of the training corpus).

A system of augmenting the intelligence of any text classification bot using a machine learning feedback mechanism model. Specialties of a self-learning feedback mechanism model include: a robust reinforcement mathematical algorithm that validates each feedback by understanding the past (previous training corpus and standard definition of each class) and the present (pattern of each feedback coming from database); a static and dynamic intelligence filtering system that has the capability to fine tune the incremental AI component by removing overlap effects and anomalies present in feedback; and a capability to introduce new classes (which the training corpus currently does not have represented) in a controlled manner. The self-learning feedback system can eliminate the decision-making conventionally provided from SMEs and save significant time and resources providing a robust mechanism more accurate than SME decision-making.

A system for validating new incremental intelligence coming from feedback before augmentation of the corpus for improving the text classification AI bot. Specialties of such an AI control system include: capability to anticipate what can happen in the future after augmentation of the new AI component coming from feedback; and incorporation of algorithms that test and validate an augmented training corpus and rapidly check its accuracy, rather than undergoing validation by a BA which can take weeks or longer. The AI control system can eliminate the testing analysis conventionally provided by BAs, and save time and resources, while providing a controlled imputation of incremental intelligence on the text classification AI Bot.

A training Corpus Advisor disclosed herein with diagnosis machine learning model and self-learning automated feedback AI control system may be highly scalable, fast, accurate, and inexpensive.

Aspects are disclosed with reference to three components: a Corpus Advisor System, a Self-learning Autonomous Feedback System, and an AI Control System.

FIG. 1 depicts an example component diagram of a corpus advisor, in accordance with aspects described herein.

A training corpus 102 of data is an initial seed that includes training samples for respective classes. In some examples, this initial corpus is provided via an SME or other entity presenting correctly-defined classes. Generally, that is provided as input to the Corpus Advisor, which diagnoses and treats (providing overlap detection filtering and noise filtering) the corpus to provide a refined training corpus (new training corpus ready) 172. The refined training corpus 172 may, in some examples, be used to train a classifier, such a text classification models for offerings such as an artificial intelligence (AI) assistant for mobile devices, messaging platforms and robots. AI assistants can provide any of various functions, example of which includes but are not limited to providing a user friendly interface (tree tooling to program multi-turn dialog and provide response variations based on different conditions), enabling collection of multiple pieces of information from a user in a single mode, enabling users to browse a catalog of already configured customer service and industry content packs, providing insights to how users are engaging and overall performance of the AI assistant, and providing users with the capability to choose whether the user's data will be used for improving models. Solutions provided by an AI assistant allow consumer applications for multiple industries such as automotive, hospitality, and others.

To give structure to the samples/examples present in the training corpus 102, each variation of the training corpus is assigned a class label pertaining to that variation. If there are 20 classes (class names in this context) with 5 examples each, then there are 100 variations total in 20 classes, where each variation has one of the 5 class labels assigned to it. This is done in part so that aspects described herein can understand the intent of each class (using different models as presented in the current disclosure). The variations/examples are passed through a data treatment process provided by a 1: N Gram Tokenizer Unit 104. The variations are passed through a sequence of steps including a basic data cleaning process, such as to convert to lower case, strip whitespace, and perform stop-word treatment, followed by a stemming process, provided by the data preprocessing unit 106. The training corpus is converted into a vector source, and tokenization up-to 3 orders is performed and stored into an Index Database 108. In this process, each class label representing corresponding samples is transformed into a vector that includes different words/entities (tokens) from the samples present in the class. Each sample/variation present in a class becomes a vector element. Each vector element is tokenized up to 3 orders (breaking the vector element into pieces so as to get the context) and these are stored into the index database 108, to provide that a vector contains a class label and all tokens up-to 3 orders from all the respective samples for that class.

1: N Gram Entropy Meter Unit 110 provides further processing, in which, from the Index Database 108, Term Frequency-Inverse Class Frequency (TFICF) matrices for all orders up-to 3 are determined and aggregated into a single matrix by assigning different weights to different order matrices. Experiments showed that the impact of $3^{rd}$ order tokens for classification was higher than lower orders even though TFICF weightage was comparatively lower. Consequently, a 1:2:4 ratio is taken for 1 gram, 2 grams & 3 grams TFICF matrices, respectively, to adjust the TFICF weights, and a weighted TFICF matrix for the training corpus is determined. The corresponding class labels are assigned to each row of the weighted TFICF matrix, and the database 112 is created. A vector space model is created from the database 112, and the rows are aggregated classwise 114 and converted into feature class vectors containing weighted TFICF tokens in a n-dimensional space, where n is the number of 1: N Gram tokens present in the vectorized classifier. In other words, after the aggregation of all three matrices followed by aggregation of 1:N gram tokens at the class level, the feature space has all tokens up-to N gram (e.g. a total number of tokens=n) along-with their weightages for each class vector (e.g. total number of classes present=c). In the vectorized classifier, there are c vectors in n-dimensional space ready for further analysis as explained below. The top N tokens are extracted (116) from each feature vector based on TFICF weight and stored into an entropy meter database 118.

Referring to Dendrogram Analysis Unit 132, from the aggregated feature space vectorized model 114, Euclidean distances are calculated between each class feature vector and put in matrix form 134, and hierarchical clustering 136 is performed from the distance matrix to form a dendrogram. The dendrogram provides an idea of how well the classes are statistically separate. The more the dendrogram has a structure resembling a staircase with similar step sizes between the corresponding feature vectors present in the dendrogram, then the more optimal the training corpus is considered to be. A mathematical algorithm, such as a pair-wise distance calculation, can be deployed to calculate distances between neighboring feature vectors to check the optimality. The algorithm can be to ensure that each class (represented by the corresponding feature vector) is distributed uniformly or statistically separate from each other based on the calculated distances. In an ideal case where all classes are statistically separate, the dendrogram would have a staircase structure.

From the aggregated feature space vectorized model 112, a visualization unit 120 calculates maximum TFICF value for each feature vector 122, and a threshold α is set by dividing max TFICF by a controlling factor n. In some examples, n is set to 5. Then, tokens with TFICF values less than a are filtered out 124, and an interactive classifier dashboard 126 is generated that contains information about the class and the most impactful tokens along with their TFICF values. In a particular example, a bubble chart is created, where the size of each bubble is proportionate to the TFICF value, and different colors are used for the different classes. This dashboard gave a flexibility to select or deselect classes represented in the corpus in order to visualize the inter-class effect and analyze the risk in terms of overlap or anomaly present in selected class(es).

Also, from the entropy meter database 118, a gauge chart 128 per class is generated showing top impacting tokens along-with the entropy score (information weight based on TFICF values). The gauge chart shows whether or not the top N tokens for the class are exhaustive in nature, i.e. all top N tokens inform about the purpose of the class with their relative importance when compared with a standard token database for each class.

The above two data visualization units may be useful in evaluating inter-class overlap effect, intra-class noise effect, and risk analysis (130) of the training corpus.

Referring back to 114 of the 1:N Gram Entropy Meter System, from here the aggregated feature space vectorized model 114 is fed into an overlap treatment unit 138, in particular a cosine similarity algorithm that calculates cosine overlap between each feature vector. A cosine angle matrix 140 of order n×n is determined, where n is the number of classes present in the training corpus. Then, a cosine threshold Θ is set and a heat map 144 is generated. In an inquiry 146, if the angle between two feature vectors is less than Θ, it was considered that the two feature vectors are significantly overlapping a and the corresponding classes are identified 148, otherwise it is considered that there is no significant overlap and no additional action is taken 150. In a particular example, Θ is set as 75°.

From the entropy meter database 118, a class overlapping token matrix 142 is determined. Overlapping classes may be identified 148 based on cosine threshold, and overlapping token detection performed from the class overlapping token matrix 142. The result is compared 152 against a standard token 1: N Gram tokenized database 160, for instance that is created based on a standard class-wise definition and expert feedback. In a particular example, based on initial training samples under supervision of a business SME, a class-dictionary is created for each class, and that class-wise dictionary includes keywords, phrases, and related synonyms (or phrase variations) considered important for that class. Comparison 152 is performed as a sort of 'sanity check'. This standard tokenized database 160 can help ensure that when the initial training corpus is fed to any text classification machine learning system, it learns the desired features only for the respective classes. If the overlap is equivalent to the standard, no action is taken 154, otherwise the undesirable overlap detection results are stored (168) to a recommendation unit 166.

A Noise Treatment Unit 156 is also provided, in which tokens of the entropy meter database 118 are compared class-wise 158 with the standard token 1: N Gram tokenized database 160. If no significant anomaly was found on comparison, the class is given a green signal and no additional action is taken 162. Otherwise, an anomaly is found as a class with noisy tokens 164, and the class is sent for noise treatment, i.e. anomaly detection results are stored 168.

Stored overlap detection results (from 152) along-with noise detection results (from 164) in the recommendation unit 166 are fed into the recommendation engine 170. A filtering algorithm is deployed to remove undesired overlap and noisy tokens from the corresponding classes present in the initial training corpus 102. Then, a refined, high-quality training corpus 172 is produced, with no undesired overlapping and/or noisy tokens/features.

Figure 2:
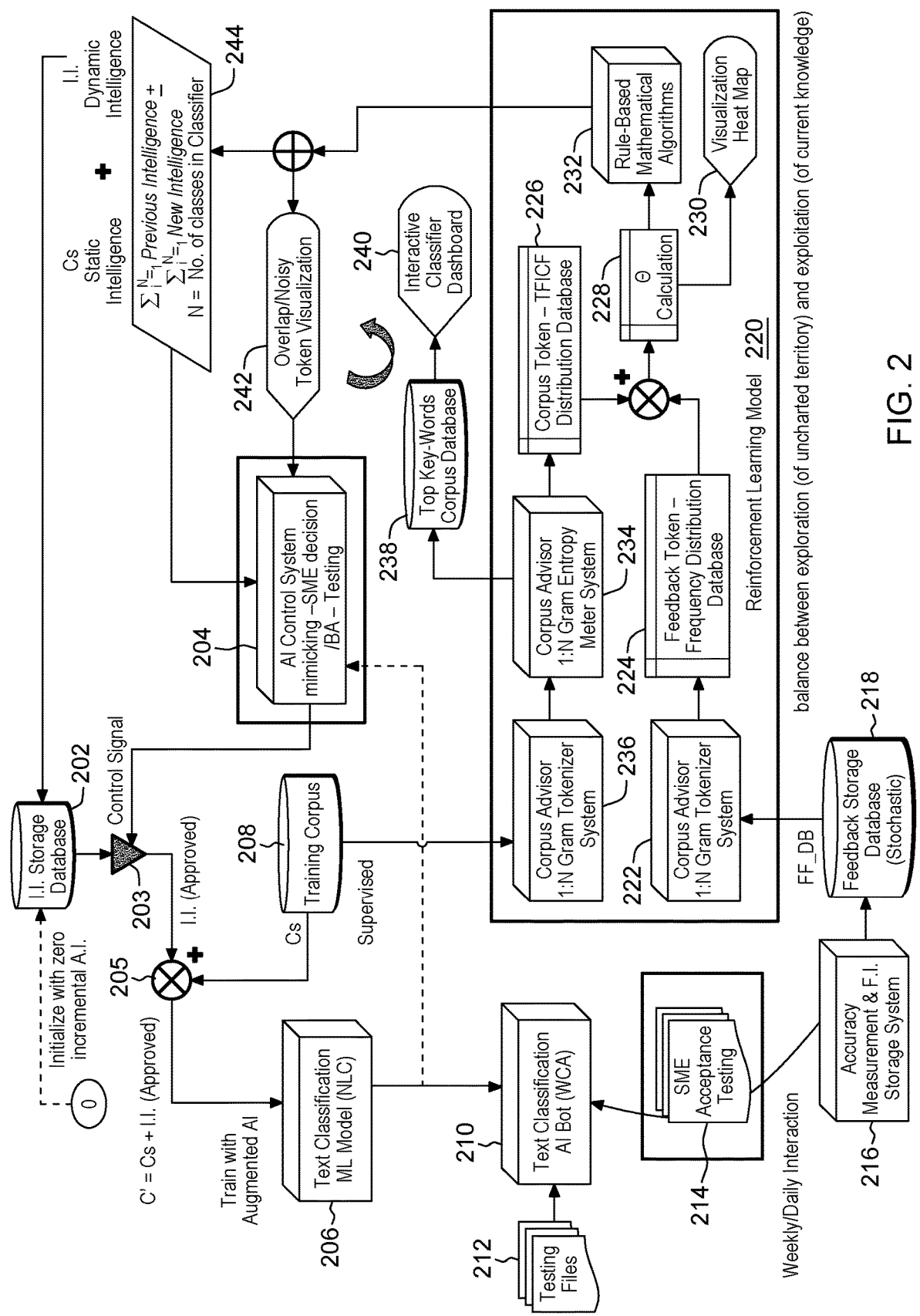
FIG. 2 depicts an example architecture design for an autonomous regenerative feedback control system, in accordance with aspects described herein.

FIG. 2 depicts an example architecture design for an autonomous regenerative feedback control system, in accordance with aspects described herein. The Incremental Intelligence (I.I.) Storage Database 202 contains all new, approved feedback samples, including those samples which were treated using the Overlap Treatment System & Noise Treatment System as explained herein. The database 202 is initialized with zero "incremental AI". Incremental AI is added overt time based on feedback, as explained herein. C' represents a new or 'augmented' training corpus, which is composed of Cs ('static' intelligence of the refined training corpus (e.g. from FIG. 1)) together with approved feedback (new class/intent feedback as explained with reference to FIG. 3) and approved treated feedback (feedback for existing classes, which feedback has been noise and overlap filtered as explained with reference to FIG. 3, which depicts a reinforcement learning model).

Seed Training Corpus 208 (Cs) is an initial training corpus, which was refined as described with reference to FIG. 1. A control signal 203 from AI control system 204 controls augmentation 205 of the training corpus 208 (Cs) with approved incremental intelligence. The augmented training corpus is used to train a text classification machine learning model 206, such as a natural language classifier, that is leveraged by a text classification AI bot 210, such as an AI Assistant, to perform classification of testing files 212 with unstructured data.

Figure 4:
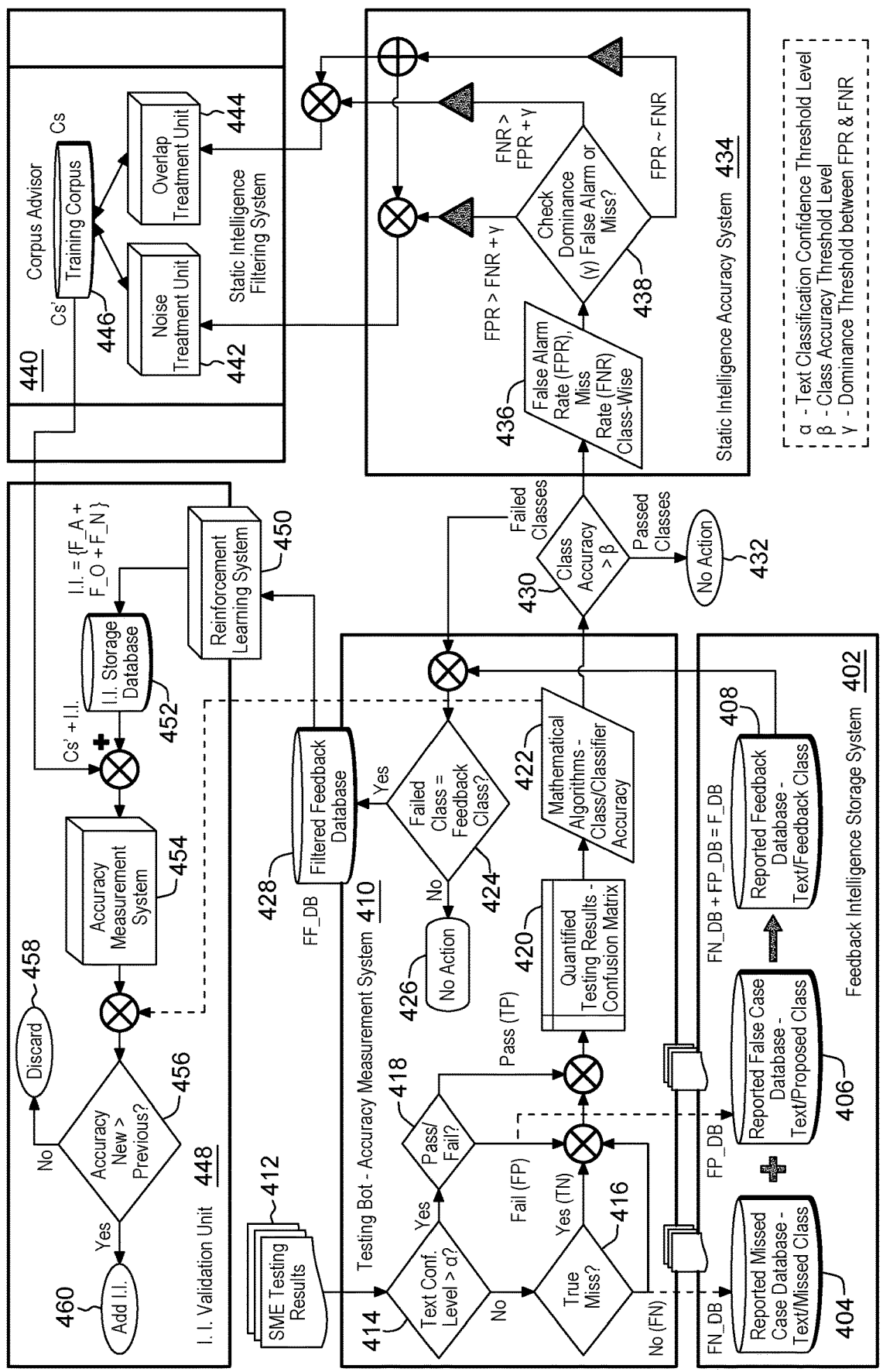
FIG. 4 depicts an example component diagram of an approach for artificial intelligence augmentation control, in accordance with aspects described herein.

In this example, SME acceptance testing feedback 214 from business users is collected, aggregated on a weekly or daily basis, and fed to an accuracy measurement system 216 for feeding to a feedback storage database 218, further details of which are provided with reference to FIG. 4.

Figure 3:
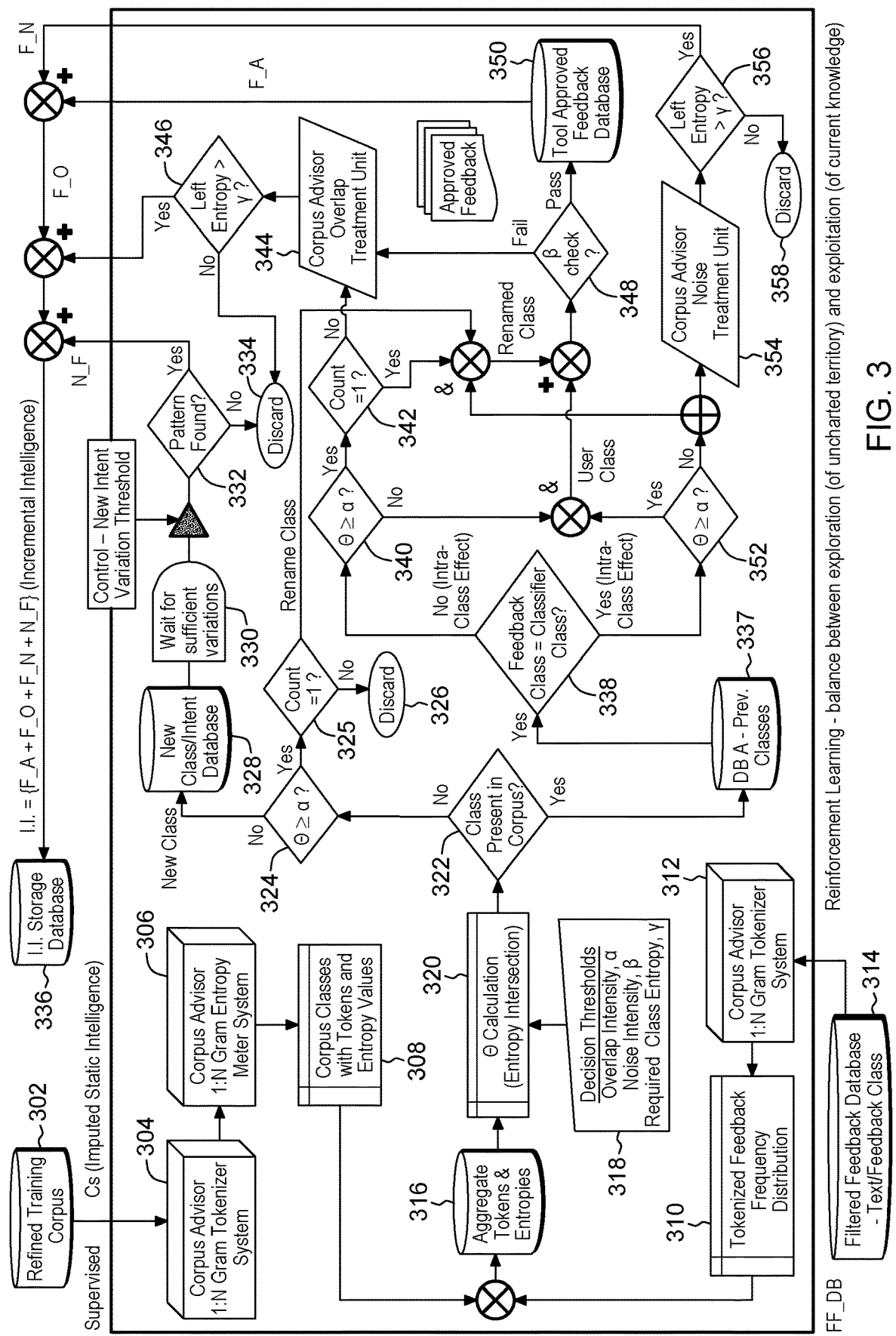
FIG. 3 depicts an example component diagram of a reinforcement learning model, in accordance with aspects described herein.

Filtered feedback database 218 is fed with training corpus 208 into a reinforcement learning model 220, presented here in FIG. 2 as well as in FIG. 3 showing further details. The reinforcement learning model 220 leverages the Corpus Advisor 1:N Gram Tokenizer System 236 (FIG. 1, 104) and Entropy Meter System 234 (FIG. 1, 110) to produce a Corpus Token—TFICF distribution database 226 which is fed together with feedback token frequency distribution database 224 also generated by the Corpus Advisor 1:N Gram Tokenizer System 222 (FIG. 1, 104) for an entropy intersection inquiry including an entropy intersection parameter (Θ) calculation 228 and comparison of allowable overlap intensity (α) between feature vectors from each database. A visualization heat map 230 may be produced. Rule-based mathematical algorithms 232 are provided to produce the intelligence flowing to component 244. Meanwhile, for the comparison from the Corpus Advisor 1:N Gram Entropy Meter System 234, top key-words (token) corpus database 238 is generated to provide an interactive classifier dashboard 240.

Approved existing corpus, feedback feature vectors, and passed treated feedback vectors (collectively the 'previous intelligence' and 'new intelligence') 244, from the reinforcement learning model 220, are aggregated and stored in the Incremental Intelligence Storage Database 202. A static intelligence database portion includes approved and passed treatment feature vectors from the initial/starting training corpus, while a dynamic intelligence database portion includes approved & passed treatment vectors from the aggregated feedback. Overlap/noisy token visualization 242 is also provided based on the intelligence from reinforcement learning model 220.

Referring to AI control system 204, which is explained in further detail with reference to FIG. 4, the static intelligence database portion and dynamic (incremental intelligence database) portion are aggregated into an augmented intelligence training corpus database (not pictured) for the new automated testing results to be fed into an accuracy measurement system to determine an anticipated new classifier (based on training with the augmented training corpus) accuracy.

A control algorithm was implemented to decide whether or not to augment the training corpus with the new incremental AI components based on the previous classifier accuracy and anticipated classifier accuracy. If the new accuracy is greater than the previous accuracy (which would ideally be the case), the text classification bot 210 is augmented with new AI components.

The whole feedback process can be repeated and automated without any manual intervention.

FIG. 3 depicts an example component diagram of a reinforcement learning model, providing feedback selection, in accordance with aspects described herein.

The refined training corpus 302 (e.g. an output of FIG. 1, designated as refined training corpus 172) and filtered feedback database 314 serve as inputs to the reinforcement learning model. Filtered feedback database is fed into the Corpus Advisor 1: N Gram Tokenizer System 312 and a feedback feature vector space is created with each feedback as a feature vector containing 1: N Gram tokens. Then, a feedback Token-Frequency Distribution Database 310 (224 of FIG. 2) is created from the feedback feature vector model. Similarly, using the Corpus Advisor 1: N Gram Tokenizer unit 304 and Corpus Advisor 1: N Gram Entropy Meter system 306, a corpus feature vector space for the existing training corpus is created. A corpus Token-TFICF distribution database 308 (226 of FIG. 2) is created from the training corpus feature vector model. These are aggregated into component 316 for an entropy intersection Θ calculation (320, see also FIG. 2, 228). In this regard, an algorithm is implemented, such as the algorithm detailed with reference to FIG. 7, to calculate hit entropy and available entropy up-to N grams between two vector space models, in this case one being the feedback feature vector space and the other being the corpus feature vector space. For each pair of a feedback feature vector and a corpus feature vector, an entropy intersection parameter is calculated using the formula. Thus, as an example, an incoming feedback feature vector is compared with all of the corpus feature vectors; consequently, multiple entropy intersection parameters are calculated for each feedback feature vector. As explained further herein, based on its 'dominance' as determined using the feedback selection algorithm, a decision is taken with respect to that feature vector—Approve, Rename, Discard, or New.

A decision table is created and three decision thresholds 318 are set in the algorithm—an overlap intensity threshold α, noise intensity threshold β, and minimum class entropy threshold γ. Although these thresholds could be adjusted/fine-tuned for each class to obtain desired results, in many embodiments the impact would be considered the same for all the classes, meaning that the three thresholds can be set the same regardless of the class in question.

The overlap intensity compares already-learned features from the corpus against the feedback for a particular class. A higher cut-off (threshold) will work to prevent the machine from learning new items, as it will try to learn similar items or else discard. A lower cut-off (threshold) may result in irrelevant learning derived from the outside environment (feedback).

The noise intensity threshold helps to curate compound sentences with multiple intents (talking about two or more classes) which, on addition, can unnecessarily introduce noise in the classifier. A higher noise intensity threshold will work to prevent desired examples from user feedback from being added to the corpus. A lower noise threshold will work to destabilize the classifier.

The minimum class entropy threshold sets the context from an example for a class. This ensures that the feedback vector after overlap/noise treatment is good enough to be added to the correct class. A lower entropy threshold will unnecessarily add weight to few keywords and, as a result, the corresponding class may pick irrelevant samples. In a next feedback cycle, the result may get even worse for that particular class. A higher threshold will work to prevent good examples or new variants from being added to the corresponding class.

The best or desired selection for the different thresholds can depend upon the nature of the business use-case and how significantly the language of the class varies. In particular examples, the overlap intensity threshold is between 0.4 and 0.65, the noise intensity is almost half of the overlap intensity, e.g. 0.2 to 0.3, and the minimum class entropy threshold is 0.3 to 0.6 of total class entropy for the corresponding class.

For each corpus feature vector-feedback feature vector pair, an inquiry 322, 'Class Present in Corpus?', determines whether the class of the feedback feature vector is present in the corpus (i.e. whether the class of the feedback feature vector is represented in the training corpus). This results in the creation of two databases and corresponding two different process flows.

Database A 337 collects classes present in the feedback vector model and also in the corpus vector space model. Database B 328 collects the new classes present in feedback vector model but not represented in the corpus vector space model.

Thus, an entropy intersection parameter is calculated 320 for each pair of feedback feature vector and corpus feature vector. If the class of the feedback feature vector is already represented in the corpus (322, Yes), then an inquiry 338 is made as to whether the class of the feedback feature vector matches the class of the corpus feature vector for that pair that is being compared. If the classes are different (338, No), then the feedback feature vector-corpus feature vector pair represents an inter-class effect situation, otherwise (338, Yes) the feedback feature vector-corpus feature vector pair represents an intra-class effect situation. Those inter-class feedback feature vectors whose entropy intersection parameter Θ is less than the allowable overlap intensity α (i.e. 340, No), and those intra-class feedback feature vectors whose entropy intersection parameter Θ is greater than or equal to the overlap intensity threshold (i.e. 352, Yes) are approved.

For (i) those inter-class feedback feature vectors whose entropy intersection parameter Θ was greater than or equal to allowable overlap intensity α (340, Yes) and are the only instance for that feedback feature vector (342, YES) (i.e. for comparisons of the feedback feature vector to the inter-class corpus vectors, the total number for which $0 \geq \alpha$ is equal to 1), and (ii) those intra-class feedback feature vectors whose entropy intersection parameter Θ is less than allowable overlap intensity α (352, No), then the class of the feedback feature vectors is renamed to an inter-corpus class and fed to the approved feedback database 350 (after passing the β check 348).

Disapproved feedback feature vectors from the intra-class effect (352, No) are also sent to the Noise Treatment Unit 354 in the Corpus Advisor. After noise treatment, the left entropy of these vectors are compared to the minimum class entropy threshold γ (356). Passed vectors (i.e. 356, Yes, in which the left entropy is greater than threshold γ) are added with the initial approved feedback vectors from the approved feedback database 350 to the storage database 336, otherwise (the failed vectors) are discarded 358.

Disapproved feedback feature vectors from the inter-class effect (340, Yes) which are not the first encountered (342, No) are sent to the overlap treatment unit 344 of the Corpus Advisor. After overlap treatment, left entropies of these vectors are compared to the minimum class entropy threshold γ to determine whether the left entropy is greater than the minimum class entropy threshold (346). Passed vectors (346, Yes) are added to the storage database 336, otherwise failed vectors (346, No) are discarded 334.

β-check (348) is performed for approved feedback feature vectors (i.e. coming from (i) (342, Yes), (ii) (340, No), and (iii) (352, Yes). A described further herein, a 'forbidden region' is defined around the overlap intensity threshold (α) by adding the noise threshold (α+β) and subtracting the noise threshold (α−β). If the top two entropy intersection parameters for a feedback feature vector is found in the forbidden region, with one such parameter on the left and one on the right around the decision boundary, this represents a β-check fail (348, Fail), those feedback feature vectors are sent for overlap treatment 344, and, based on the left entropy satisfying the minimum class entropy threshold (346, Yes), they are finally approved. Other approved feedback feature vectors not falling into this case (i.e. 348 Pass) are saved in the approved feedback database 350 as approved for adding to the incremental intelligence storage database 336. Aspects of this β-check are also described with reference to FIG. 9.

Returning to inquiry 322, if the class of the feedback feature vector is not already represented in the corpus (322, No), an inquiry 324 is made as to whether the overlap intensity threshold is greater than the allowable overlap intensity (Θ≥α?). If so (324, Yes), then an inquiry (325) is made as to whether this is the only feedback feature vector for which Θ>α (i.e. count=1?). If not (i.e. count >1), then the feature vector is discarded 326. Otherwise (325, Yes), the class is renamed (i.e. the initial classification is changed to one of the other classes as described herein). Otherwise, if at 324 it is determined that Θ<α (324, No), the class of the feature vector is considered a new class which is added to Database B, new class/intent database 328. Further, before adding new approved intents/classes to the incremental intelligence storage database 336, the process to do so is delayed until a threshold number of number of variations 330 for the specific new class are added to the database 328. Thus, the samples under a new class/intent represented by a feedback feature vector get stored in the new class/intent database. After finding a sufficient number of variations 330, those samples get added with the appropriate new class label given by the user. This intent variation threshold ensures the system is confident enough to understand a pattern of the new class. Those variations of new classes not conforming with the learned pattern of the new class (332, No) are discarded, otherwise (332, Yes) are added.

The approved feedback feature vectors and passed treatment vectors are aggregated and stored in the incremental intelligence storage database 336.

By way of specific example, assume that classes A, B, C, and D are represented in the existing corpus and classes A, C, D, E are represented in the feedback database. Assuming there is only one feedback instance (feedback instance=example=sample=variation) for each class A, C, D, E, a total of 4*4=16 Θ calculations (320) and comparisons (322) are be performed. For instance, the feedback feature vector for class A from the feedback database will be compared against all four corpus class feature vectors present in the corpus database. Based on the different Θs, the best class for that feedback will be chosen irrespective of any class the user has assigned. This would repeat for the feedback feature vector for classes C, D, and E.

To illustrate further, had there instead been multiple feedback instances, say 3 for class A, 2 for class C, 1 for class D, and 1 for class E, then the total comparisons would be 7*4=28.

In this example, since E is a new class proposed by a user via the feedback, before making the decision for integration of that into the training corpus, a 'sanity check' is done on the quality of the feedback instance & the label assigned to it. Hence, E will be compared against A, B, C, D. Based on 4 different values of Co, the decision is made. If all four Θs are less than alpha (the overlap intensity threshold), then the class of that feedback instance is assigned as a new class. This new feedback instance gets stored in the new intent/class database where it waits for sufficient variations (in some embodiments in the range of 5 to 10) pertaining to that new class, before it gets added to the training corpus as incremental intelligence. Further scenarios of Θ-α comparisons are described and depicted with reference to FIGS. 5A-5F.

FIG. 4 depicts an example component diagram of an approach for artificial intelligence augmentation control, in accordance with aspects described herein.

Testing feedback is collected, for instance from the class tree present in the Text Classification AI Bot, indicating passed, failed (false positive) and missed (false negative) cases. Reported failed cases are stored in a false case database 406 (of Feedback Intelligence Storage System 402) with the feedback text as well as a class proposed by the SME. Similarly, reported missed cases are stored in a missed case database 404 with the feedback text as well as the missed class given by the SME. Both databases 404 and 406 are aggregated and stored in a periodic reported feedback database 408.

Feedback data 412 coming from acceptance testing is quantified and translated into 1s and 0s and fed into a confusion matrix 420. An algorithm 422 is deployed to calculate class-wise accuracy and overall classifier accuracy based on numbers of hit cases, missed (false negative) cases, false positive cases, and rejected cases from the confusion matrix. Classifier accuracy is determined internally based on weighted average of the class-wise score of all classes based on the importance of classes for the classifier. A threshold β is set for the class-wise accuracy and, based on that (430), failed classes were determined using an algorithm. Then, failed classes are used for filtering the periodic reported feedback database (inquiry 424) and a new filtered feedback database 428 is created that includes only failed classes (no action 426 is taken if failed class is not equal to feedback class).

An example is said to be classified under one class when the confidence for that example is greater than a certain threshold text confidence level (414, Yes). In a particular example. In a particular example, this threshold is 0.7.

SME acceptance testing results 412 are derived from business SMEs using the text classification bot (210 of FIG. 2) agreeing or disagreeing with the result as the case may be. An 'Agree' can indicate that the bot classified an example under a particular class and the SME agreed. This is a 'true hit' case (418, Pass). A 'Disagree' can indicate that the bot classified an example under a particular class and the SME disagreed with that classification. This is a 'false hit' (418, Fail). An 'Agree' can alternatively indicate that the bot did not classify an example under any class and the SME also agreed. This is a 'true miss' (416, Yes). A 'Disagree' can alternatively indicated that the bot did not classify an example under any class and the SME disagreed. This is a 'false miss' (416, No).

A confusion matrix 420 is created, which is size N*N, where N is the number of classes present in the training corpus. Rows of the matrix define actual classes (according to business SMEs) and columns define predicted classes (according to the text classification bot). The cases are fed into the correct box and aggregated in terms of their count.

Then, performance metrics (e.g. precision, recall and accuracy) are calculated for each class based on different cases—True Positive, False Positive, True Negative and False Negative cases. Based on a threshold $\beta$, the failed classes are determined (430). No action 432 is taken on Passes Classes.

For each of the failed classes, False Positive Rate (FPR) and False Negative Rate (FNR) are calculated (436). Based on the dominance of the rate, the root cause for the particular class is estimated. High FPR can happen because of noisy tokens. High FNR can happen because of the overlap effect. Accordingly, appropriate measures are taken. The Corpus Advisor can be used to find the root cause and take recommendations, i.e. overlap treatment or noise treatment, if any. Based on inquiry 438, if FPR>FNR+the dominance threshold ($\gamma$) between FPR and FNR, then noise treatment 442 is applied. If FNR>FPR+$\gamma$, then overlap treatment 444 is applied. If FPR approximately equals FNR (e.g. within some threshold proximity), then both noise treatment 442 and overlap treatment 444 are applied.

In validation unit 448, The existing training corpus, Cs 446, is modified to a corpus, Cs', per the recommendations and stored as the static intelligence database. As noted, this static intelligence database and the incremental intelligence database 452 (with candidate samples for possible augmentation of the training corpus) are aggregated into an augmented intelligence training corpus database. Using this augmented intelligence training corpus, the text classification bot may be retrained using the classification machine learning model, and the same feedback text from testing results may be fed into the bot and new classification classes calculated. New automated testing results may be fed into the Accuracy Measurement System 454 and new classifier accuracy is determined. Then, a control algorithm is implemented to decide whether or not to augment the new incremental AI component based on the previous classifier accuracy and anticipated classifier accuracy. Based on inquiry 456, if the new accuracy is greater than the previous accuracy (456, Yes), the training corpus is augmented with the candidate feedback samples and the text classification Bot was augmented with the new AI component (i.e. retrained using the augmented corpus). Otherwise (456, No) some/all of the incremental AI may be discarded (458).

The whole feedback process can be repeated and automated without manual intervention. In practical applications, the new model was powerful at least in that it had the ability to understand past occurrences (via the Corpus Advisor) and the present in terms of what is coming from feedback using the Self-Learning Machine Learning Model, and anticipate future occurrences using an AI control system.

FIGS. 5A-5F illustrate example scenarios for Corpus Advisor classification recommendations, in accordance with aspects described herein. The Feedback Selection Technique (Approve/Discard/Rename/New) using different scenarios occurs when a SME attempts to categorize a feedback instance. Different scenarios are presented using Venn diagrams in FIGS. 5A-5F, in which a circle represents classification of a given example in the class corresponding to that circle.

Figure 5A:
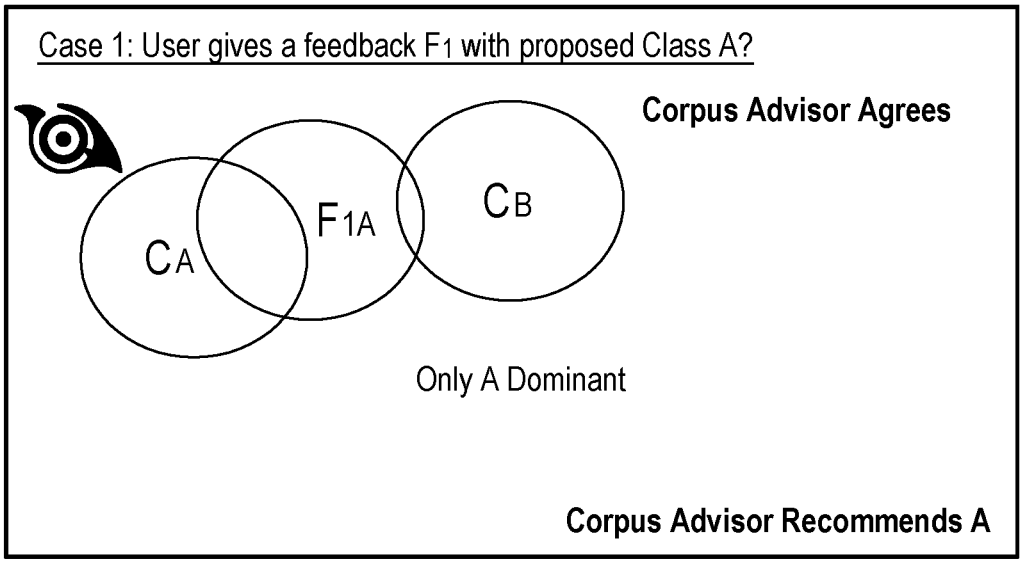
FIGS. 5A-5F illustrate example scenarios for corpus advisor classification recommendations, in accordance with aspects described herein.

In case 1, FIG. 5A, the SME user proposes class A for a specific example, represented by $F_{1A}$. Corpus Advisor analyzes and also finds that no class other than class A is dominant for that example based on the overlap intensity threshold. Overlap is represented in the overlap of $F_{1A}$ and $C_A$. There is substantially less overlap with class B (represented by $C_B$). Corpus Advisor therefore Agrees in this case that the feedback is correctly classified in class A.

Figure 5B:
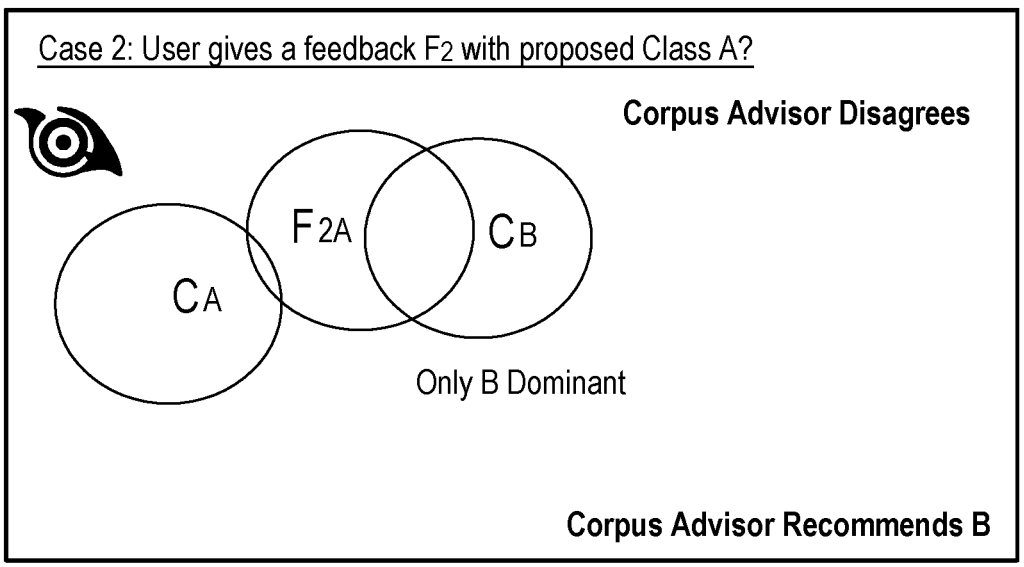

In case 2, FIG. 5B, the SME user proposes class A for a specific example, $F_{2A}$. However, Corpus Advisor analyzes and finds that another class, B, is dominant with no other classes (e.g. class A) being dominant for that example. It curates the feedback and assigns class B to that example. Corpus Advisor therefore Disagrees with the SME classification in this case.

Figure 5C:
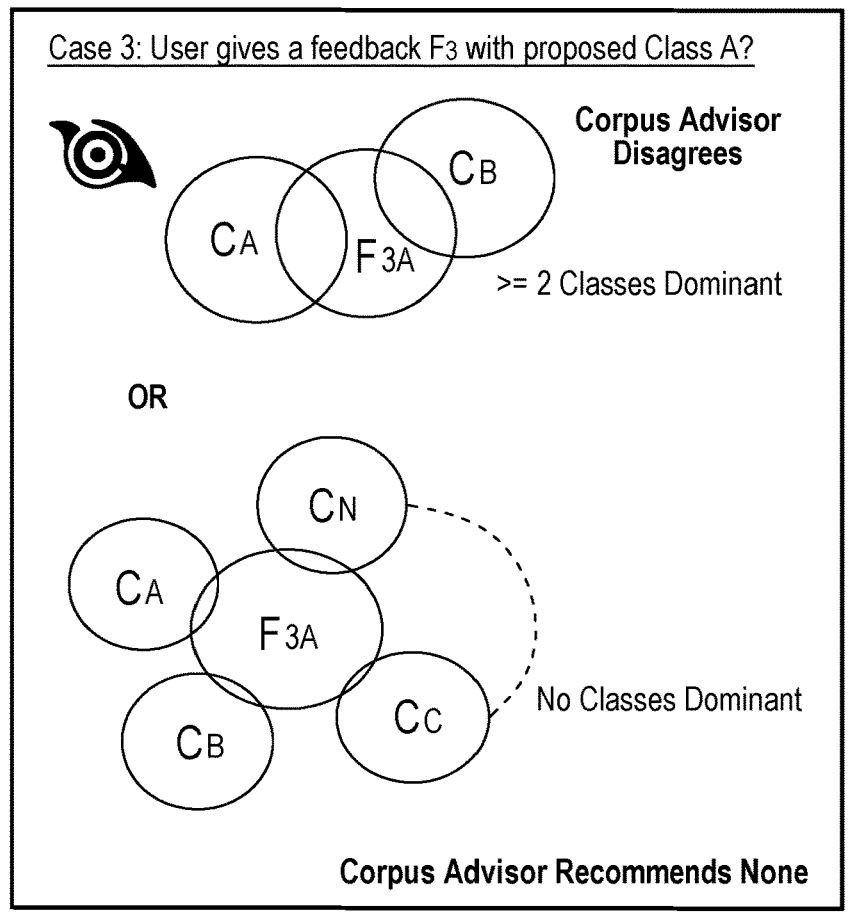

In case 3, FIG. 5C, the SME user proposes class A for a specific example, $F_{3A}$. Two example scenarios are presented here—Corpus Advisor analyzes and finds either (i) that two (in this example) classes, $C_A$ and $C_B$, are dominant for that example or (ii) that no class (e.g. out of A, B, C, . . . N) is dominant. In either case, no class is recommended, and instead the feedback is sent to the treatment system. Corpus Advisor therefore Disagrees with the SME classification in this case.

Figure 5D:
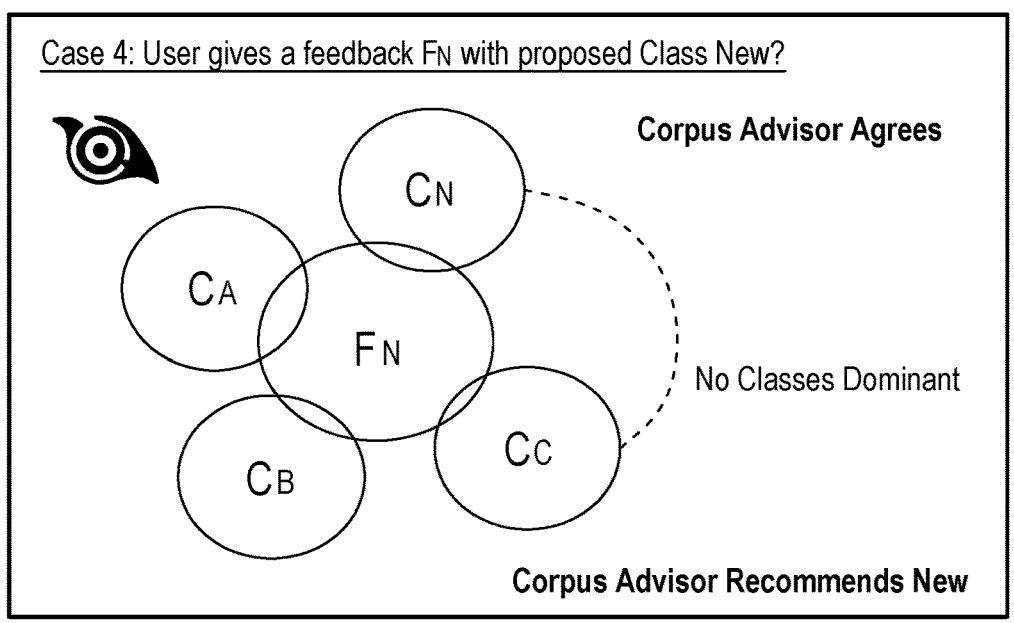

In case 4, FIG. 5D, the SME user proposes a new class for a specific example $F_N$. Corpus Advisor analyzes and also finds that no class already present in training corpus is dominant for that example based on overlap intensity threshold. The Corpus Advisor Agrees in this case. It accepts that example with a new class label and waits for sufficient variations until it is added to the corpus.

Figure 5E:
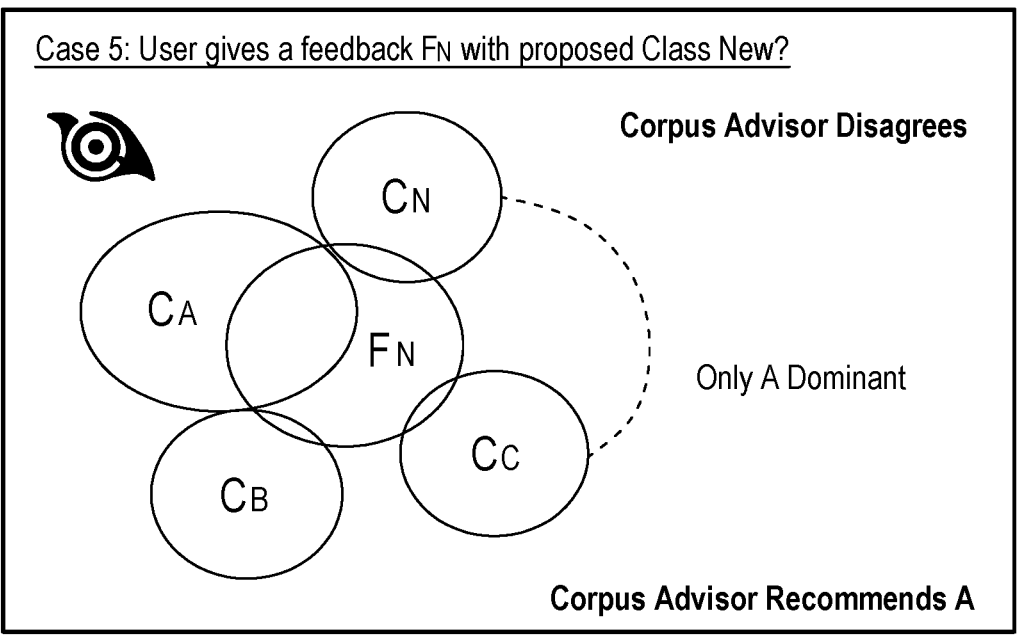

In case 5, FIG. 5E, the SME user proposes a new class for a specific example, FN. Corpus Advisor analyzes and finds that class A is dominant for that example. The Corpus Advisor Disagrees with the SME classification in this case. It does not accept this example into a new class, and instead assigns it to an existing class, class A.

Figure 5F:
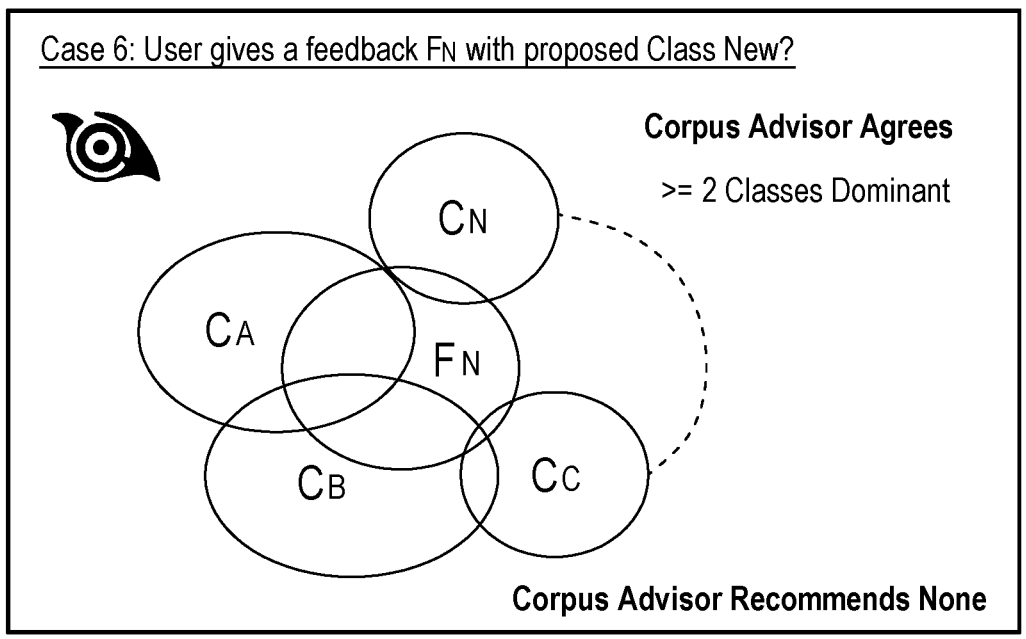

In case 6, FIG. 5F, the SME user proposes a new class for a specific example, $F_N$. Corpus Advisor analyzes and finds that two (in this example) classes, $C_A$ and $C_B$, are dominant for that example. Corpus Advisor therefore Disagrees with the SME classification in this case, and recommends no class.

The following Table 1 summarizes the above six cases:

TABLE 1

Example Corpus Advisor Classification Recommendations

| Feedback Instance | User Proposed Class | Tool Agree/ Disagree | Corpus Advisor Rec. Class |
|---|---|---|---|
| F1 | A | Y | A |
| F2 | A | N | B |
| F3 | A | N | None |

TABLE 1-continued

Example Corpus Advisor Classification Recommendations

| Feedback Instance | User Proposed Class | Tool Agree/ Disagree | Corpus Advisor Rec. Class |
|---|---|---|---|
| F4 | New | Y | New |
| F5 | New | N | A |
| F6 | New | N | None |

Aspects described herein, including the Corpus Advisor classification recommendations described with reference to FIGS. 5A-5F, make use of a feedback selection algorithm/technique. This is described in further detail with reference to FIG. 6, which depicts an example approach for a recommendation classification scheme of a reinforcement learning model, in accordance with aspects described herein.

Figure 6:
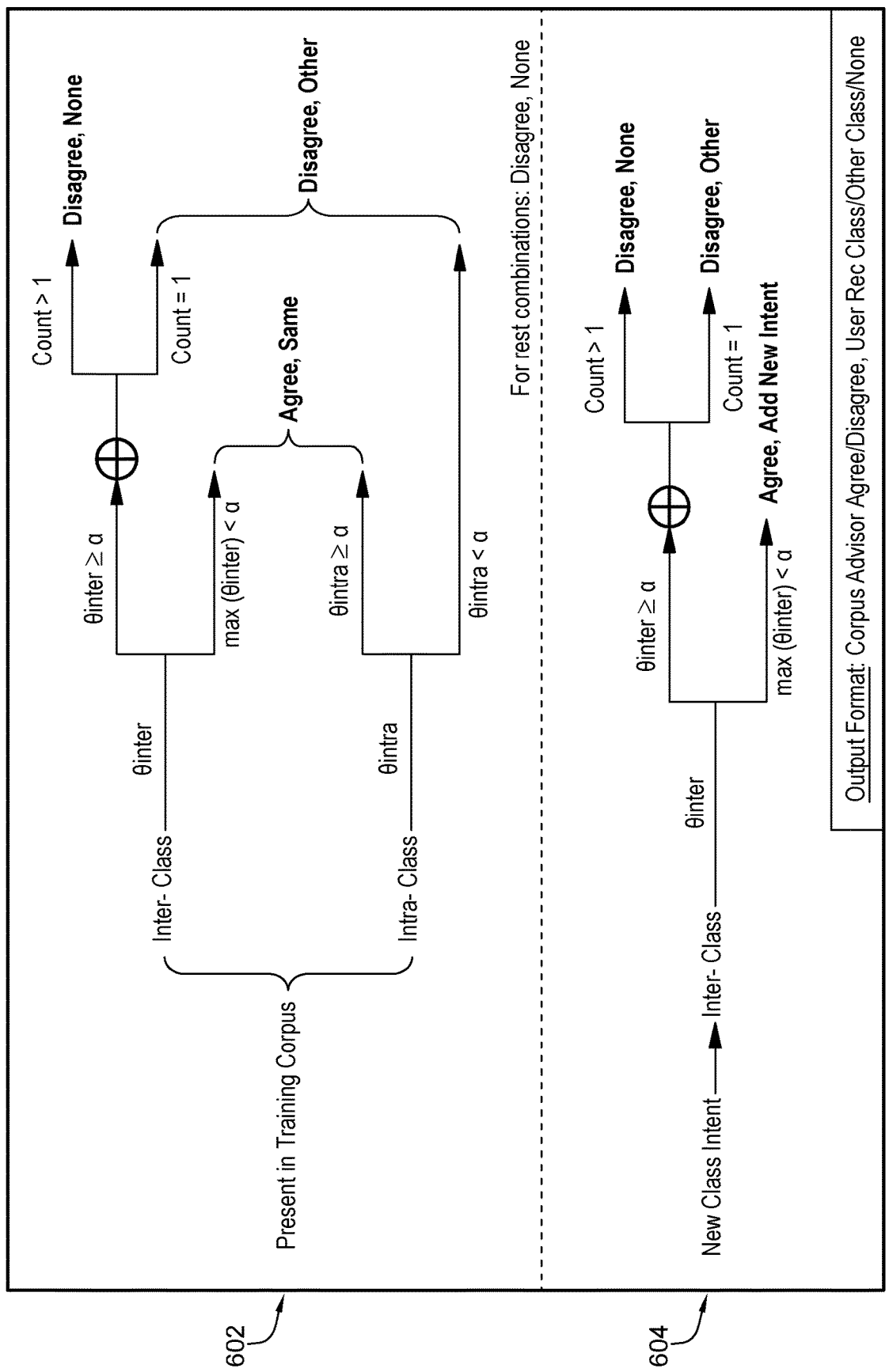
FIG. 6 depicts an example approach for a recommendation classification scheme of a reinforcement learning model, in accordance with aspects described herein.

FIG. 6 presents two processes, 602 and 604. 602 is followed when the user (e.g. SME or other user) recommends, for classification of a feedback example, a class already present in the corpus. 604 is followed when the user recommends a new class that is not already present in the corpus. Using the Entropy Intersection Parameter (Θ) and Overlap Intensity Threshold (α), along-with the number of dominant classes (count) found by Corpus Advisor, a final decision is taken.

Thus, referring to FIG. 6, 602 is followed if the feedback class recommended by the user exists in the corpus (FIG. 3 #322, Yes). For each such feedback feature vector for which the feedback class recommended by the user exists in the corpus, a respective Θ is calculated in comparison to each corpus class vector. For each feature vector, then, there will be one $\Theta_{intra}$ (i.e. as between the feedback feature vector and the corpus feature vector for that class of the feedback feature vector) and some collection of (potentially multiple) $\Theta_{inter}$ value(s) (i.e. a respective $\Theta_{inter}$ for each other class in the current corpus) determined. The process of 602 is followed for each of these two situations. For the intra-class situation (FIG. 3, #338, Yes), in which $\Theta_{intra}$ (the entropy intersection parameter) is determined between the feedback feature vector and the corpus feature vector of that recommended class, an inquiry is made as to whether $\Theta_{intra} \geq \alpha$ (the overlap intensity threshold). Meanwhile, for the inter-class situation (FIG. 3, 338, No), i.e. the collection of calculated $\Theta_{inter}$ value(s), an inquiry is made as to whether the maximum $\Theta_{inter}$ is less than α. If the maximum $\Theta_{inter}$ is less than α and $\Theta_{intra} \geq \alpha$, then Agree and the feedback feature vector is classed with the user-recommended class.

If instead any $\Theta_{inter} \geq \alpha$, then the action depends on whether count >1. If count >1, then no class is used for the feedback feature vector and it is discarded. Otherwise, if count=1, then the algorithm disagrees with the classification of the feedback feature vector. However, whether the vector is reclassified or discarded depends on $\Theta_{intra}$; if $\Theta_{intra} < \alpha$, then another classification is used (e.g. the most dominant), otherwise (and for all other combinations falling within the 'class present in training corpus' situation of process 602), no class is used for the feature vector and it is discarded.

Still referring to FIG. 6, 604 is followed if the feedback class recommended by the user does not exist in the corpus (FIG. 3 #322, No). In this case, by definition, the only class interactions are inter-class, and therefore a collection of $\Theta_{inter}$ value(s) are determined. Accordingly, $\Theta_{inter}$ (the entropy intersection parameter) is determined relative to each corpus vector, and if max($\Theta_{inter}$) <α, Agree and the feedback feature vector is added as a new intent to the new class/intent database. Otherwise, if some $\Theta_{inter} \geq \alpha$, then Disagree. However, as before, whether the class to use for the feedback feature vector is another class or none (i.e. discard) depends on the count. If count=1, then use another class (e.g. the most dominant class). Otherwise (count >1), no class is used for the feedback feature vector and it is discarded.

Figure 7:
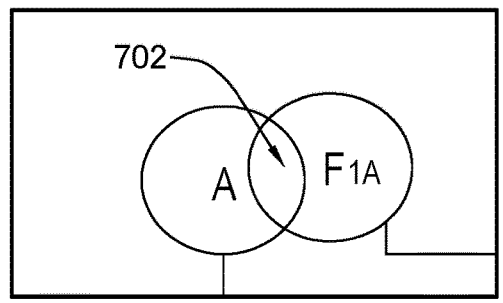
FIG. 7 illustrates an example entropy intersection relationship, in accordance with aspects described herein.

FIG. 7 illustrates an example entropy intersection relationship, in accordance with aspects described herein. The figure illustrates the implication of the calculation of the entropy intersection parameter between a corpus class feature vector A and a feedback feature vector F1A, which gives an idea how much information content present in the feedback is overlapping (area 702) with one class. This is calculated based on different keywords, phrases (tokens up-to 3 orders) present in the feedback vector and the frequency or number of times these feedback tokens are hitting a particular class vector, keeping in consideration the weight of those tokens are already known (since TFICF values for those are already present in the entropy meter database). Further, this value is to be compared with the overlap intensity threshold to measure how much information is overlapping.

A mathematical algorithm deployed to do this task includes:

(i) A is a corpus class. F1A is one feedback vector with proposed class A by the user.

(ii) Using TFICF values present in the entropy meter database, create TFICF distribution database for all corpus classes. TFICF of a class token shows its information weight on that class.

(iii) Then, a temporary feedback Token-Frequency Distribution Database where for each feedback, the frequency of appearance of tokens (up-to 3 orders) were stored against that feedback.

(iv) For a particular order, say 1-gram, total information content for class A is calculated and named as total available entropy A(n). Also, from feedback frequency distribution database, feedback token(s) related to F1A are compared against Class A tokens present in the Corpus TFICF Distribution Database. Hit feedback tokens are taken into consideration and their TFICF values are aggregated keeping in the consideration of their frequencies, and hit entropy (A(n) ∩ F1A(n)) is calculated. Hit entropy refers to the extent that information content present in a feedback vector overlaps with the information content present in the Corpus Class Vector.

Hence:

In the notation $T_{Mxy}$: M refers to the Corpus (M=A)/Feedback (M=F) Class, x is the N-gram, and y is Token number.

$F_{1A}$ is a three element set with elements for: (i) 1-Gram Subset Frequency, $f_{1\text{-}Gram}$, (ii) 2-Gram Subset Frequency, $f_{2\text{-}Gram}$, and (iii) 3-Gram Subset Frequency, $f_{3\text{-}Gram}$.

$F_{1A} = \{\{T_{F11}, T_{F12}, \ldots, T_{F1n}\}, \{T_{F21}, T_{F22}, \ldots, T_{F2n}\}, \{T_{F31}, T_{F32}, \ldots, T_{F3n}\}\}$.

A is a three element set with elements for: (i) 1-Gram Subset Frequency, $TFICF_{1\text{-}Gram}$, (ii) 2-Gram Subset Frequency, $TFICF_{2\text{-}Gram}$, and (iii) 3-Gram Subset Frequency, $TFICF_{3\text{-}Gram}$.

$A = \{\{T_{A11}, T_{A12}, \ldots T_{A1n}\}, \{T_{A21}, T_{A22}, \ldots, T_{A2n}\}, \{T_{A31}, T_{A32}, \ldots, T_{A3n}\}\}$.

$A = \sum_{i=1}^{n} TFCIF(i) * \max(Count(i), Freq(i)); \forall T(i) \in A$ $A \cap F_{1A} = \sum_{i=1}^{n} TFCIF(i) * Freq(i) * Hit(i); \forall T(i) \in A$ -(v) The entropy intersection parameter is calculated by dividing hit entropy by total available entropy for that order. Similarly, entropy intersection parameters for other orders (2-Gram, 3-Gram) are calculated. For n=1, 2, 3, $$\theta_{N-Gram} = \frac{A(n) \cap F_{1A}(n)}{A(n)}.$$

-(vi) Finally, a revised entropy intersection parameter was calculated for $F_{1A}$ keeping all three intersection parameters in mind using a mathematical formula so as to quantify the impact properly:

$$\theta = \theta_{1-Gram} + (1-\theta_{1-Gram})*\theta_{2-Gram} + \{1-(\theta_{1-Gram} + (1-\theta_{1-Gram})*\theta_{2-Gram})\}*\theta_{3-Gram}$$

Table 2 below presents summary example values for Tokens, Count, TFICF, hit, freq, total entropy, and hit entropy.

TABLE 2

Example Values

|  | Token | Count | TFICF | Hit | Freq | Total Entropy | Hit Entropy |
|---|---|---|---|---|---|---|---|
| Token 1 | resubmit | 1 | 10.379649 | 0 | 0 | 10.379649 | 0.000000 |
| Token 2 | revis | 1 | 10.147409 | 0 | 0 | 10.147409 | 0.000000 |
| Token 3 | made | 1 | 9.209724 | 1 | 1 | 9.209724 | 9.209724 |
| Token 4 | deliver | 1 | 8.603689 | 1 | 2 | 17.207379 | 17.207379 |
| Token 5 | deem | 1 | 7.735793 | 1 | 1 | 7.735793 | 7.735793 |

Figure 8:
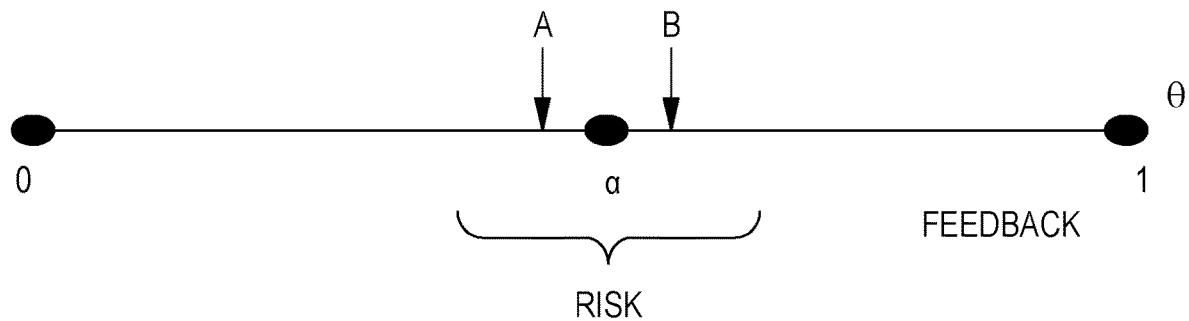
FIGS. 8 and 9 depict example decision table boundary conditions, in accordance with aspects described herein.
Figure 9:
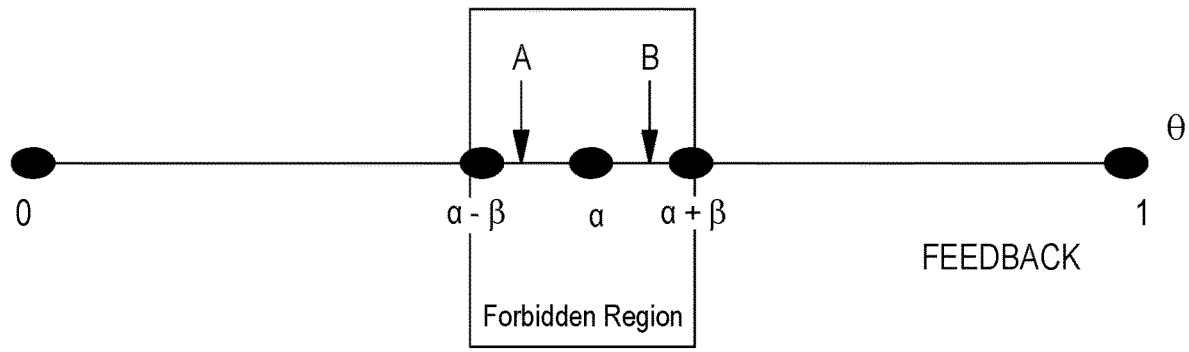

FIGS. 8 and 9 depict example decision table boundary conditions, in accordance with aspects described herein. Again, $\alpha$=overlap intensity threshold between the corpus class and the feedback class, while $\beta$=noise threshold between inter-corpus classes. FIG. 8 illustrates a 'risk' region about the overlap intensity threshold ($\alpha$). In the calculations of the different $\Theta$ for a feedback feature vector and comparison with $\alpha$, two (or more) $\Theta$ can occur on the opposite sides of $\alpha$, though the values may still be very close. For instance, say $\alpha$=0.5, and assume for a feedback feature vector F1, $\Theta$ (F1,A)=0.49 and $\Theta$ (F1, B)=0.51, where A and B are the corpus class vectors. In this case, the Corpus Advisor ignores Class A and recommends Class B despite negligible overlapping difference between class A and class B. A forbidden region is created to avoid this risk. A final $\beta$-check is done for approved feedback feature vectors where a forbidden region is defined around the overlap intensity threshold ($\alpha$) by adding to it and subtracting from it a noise threshold, $\beta$, to produce a range $[(\alpha-\beta), (\alpha+\beta)]$. This is represented in FIG. 9 as the forbidden region, defined as the union of region A (on the lesser side of $\alpha$) and region B (on the greater side of $\alpha$).

If the top two entropy intersection parameters for a feedback vector are found within the forbidden region, with one on the left (lesser side) and one on the right (greater side) around the decision boundary (forbidden region), the feedback vector is sent for overlap treatment and, based on the left entropy satisfying the minimum class entropy threshold, the vector is finally approved. Thus, the $\beta$-check for approved feedback vectors helps avoid the overlap effect.

Figure 10:
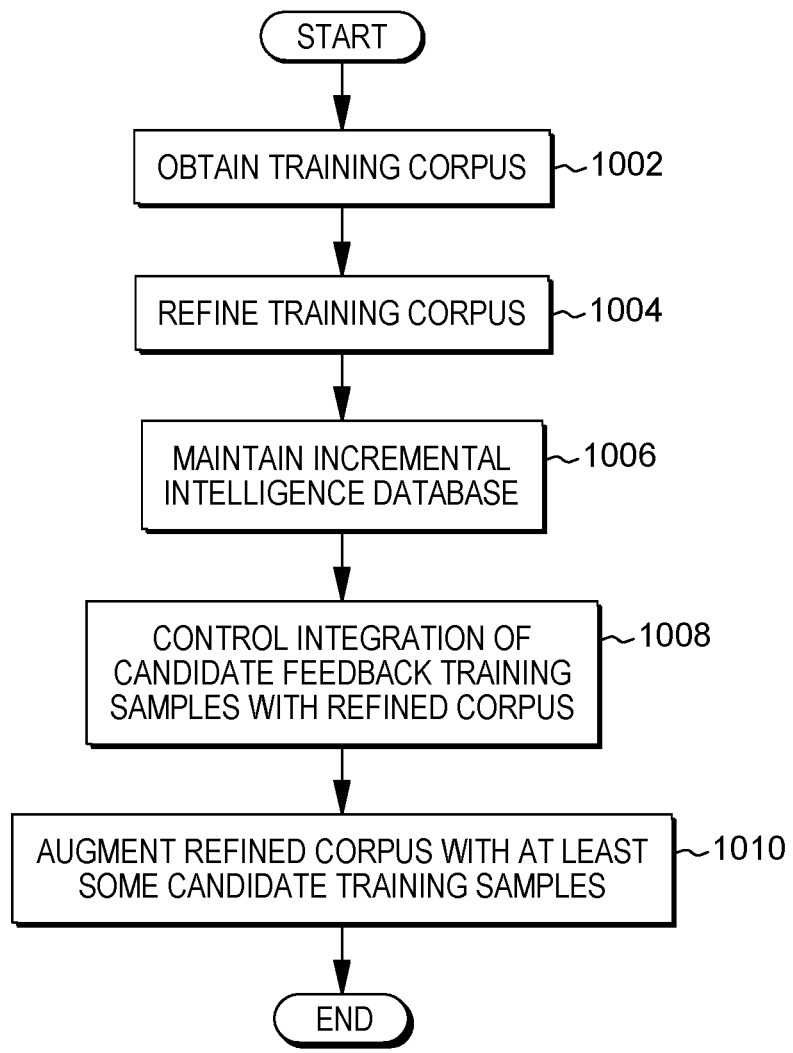
FIG. 10 depicts a process for training corpus refinement and incremental updating, in accordance with aspects described herein.

Accordingly, FIG. 10 depicts a process for training corpus refinement and incremental updating, in accordance with aspects described herein. In some examples, the process is performed by one or more computer systems, such as those described herein, which may include one or more computer systems storing and/or with access to a training corpus, one or more cloud servers, and/or one or more other computer systems.

The process begins by obtaining (1002) a training corpus of data, the training corpus including a collection of training samples. The process then refines (1004) the obtained training corpus to produce a refined training corpus of data. Refining the obtained training corpus includes applying to the obtained training corpus an overlap treatment and a noise reduction treatment, the overlap treatment and noise reduction treatment filtering out one or more samples of the collection of training samples.

In particular embodiments, the refining includes establishing a plurality of corpus feature vectors representative of the collection of training samples, building an entropy meter database, the building the entropy meter database including extracting and storing tokens from each corpus feature vector of the plurality of feature vectors based on a Term Frequency-Inverse Class Frequency (TFICF) weight, performing the overlap treatment to identify one or more overlapping training samples, performing the noise detection treatment to identify one or more noisy training samples, and filtering out the one or more samples from the training corpus, the one or more samples filtered-out from the training corpus being at least one selected from the group consisting of the one or more overlapping samples and the one or more noisy samples, the filtering out being based on quality scoring and risk determination, wherein the filtering produces the refined training corpus.

Establishing the plurality of corpus feature vectors can include, for instance, assigning each sample of the collection of training samples to a respective class of a plurality of corpus classes, and based on the assigning, building a corpus feature vector for each class of the plurality of corpus classes, each feature vector comprising weighted TFICF tokens, and the built corpus feature vector being one corpus feature vector of the plurality of corpus feature vectors.

In a particular example, performing the overlap treatment to identify one or more overlapping training samples includes identifying overlapping corpus classes based on pair-wise comparisons of the plurality of feature vectors, identifying overlapping tokens of the plurality of feature vectors, obtaining a standard class-wise token database having class-specific dictionaries of standard keywords, phrases, and synonyms, identifying the one or more overlapping training samples based on the overlapping corpus classes, overlapping tokens, and standard class-wise token database, and storing the overlapping training samples for a recommendation engine to perform the filtering out.

In a particular example, performing the noise detection treatment to identify one or more noisy training samples includes comparing tokens of the entropy meter database against tokens of the standard class-wise token database to identify anomalous tokens, identifying, based on the comparing, corpus classes having one or more noisy tokens, and storing, for a recommendation engine, indications of the noisy tokens and the identified corpus classes having one or more noisy tokens, to perform the filtering out.

Returning to FIG. 10, the process continues by maintaining (1006) an incremental intelligence database based on filtered user feedback. The incremental intelligence database stores candidate feedback training samples based on the filtered user feedback to augment the refined training corpus. In this regard, the feedback training samples are candidates because they may or may not actually be integrated into the refined training corpus.

In a particular example, the maintaining includes feeding the filtered user feedback into a reinforcement learning model, and adding the candidate feedback training samples of the filtered feedback to the incremental intelligence database based on classifying feedback training samples of the filtered user feedback into feedback classes and on assessing intra-class and inter-class effects of the classified feedback training samples. Classifying the feedback training samples can include, for example, assigning each sample of the feedback training samples to a respective class of the feedback classes. Accordingly, the method can further include establishing an overlap intensity threshold, a noise intensity threshold, and a class entropy threshold, and for each pair of a respective feedback feature vector and respective corpus feature vector: determining a respective entropy intersection value for the pair, and performing processing based on whether the class of the feedback feature vector of the pair is a class represented in the training corpus. Thus, the processing can depend on whether the feedback vector class is already represented already in the corpus. For instance, based on the class of the feedback feature vector being a new class not represented in the training corpus, the method can further include storing, in a new class/intent database, any sample of the feedback training samples classified to the feedback class for which the feedback feature vector is built, based on the entropy intersection parameter being less than the overlap intensity threshold and on the feedback feature vector passing a noise intensity check based on the noise intensity threshold. The method can further include accumulating in the new class/intent database a plurality of feedback feature vectors having the new class, and, based on (i) accumulating a threshold number of samples classified in that new class and on (ii) identifying a pattern among those samples, forwarding the accumulated samples to the incremental intelligence storage database as at least some of the candidate feedback training samples.

Alternatively, based on the class of the feedback feature vector being represented in the training corpus, the method can further include determining whether to add samples classified into the class of the feedback feature vector to the incremental intelligence storage database, the determining being based at least in part on the overlap intensity threshold, noise intensity threshold, and class entropy threshold, and whether the class of the corpus feature vector of the pair matches the feedback class of the feedback feature vector.

The method continues by controlling (1008) integration of the candidate feedback training samples with the refined training corpus. The controlling can be based at least in part on whether accuracy of classification performed based on training that includes the candidate feedback training samples as part of the refined training corpus is greater than accuracy of classification performed based on training that does not include the candidate feedback training samples as part of the refined training corpus. The method proceeds by augmenting (1010) the refined training corpus with at least some of the candidate feedback training samples to produce an augmented training corpus, for instance based on determining that the accuracy of classification performed based on training that includes the candidate feedback training samples as part of the refined training corpus would be greater than accuracy of classification performed based on training that does not include the candidate feedback training samples.

The maintaining (1006) can continually update the incremental intelligence database based on additional filtered user feedback, to produce updated candidate feedback training samples. The method can therefore further include repeating the controlling integration (1008, below) and the augmenting (1010, below) using the updated candidate feedback training samples.

In some examples, the method also includes building a filtered feedback database for the filtered feedback, the building of the filtered feedback database including determining class-wise accuracy based on numbers of hit cases, missed (false-negative) cases, false-positive cases, and rejected cases as reported in the user feedback, and storing to the filtered feedback database feedback training samples for failed classes for which class-wise accuracy is above a threshold class accuracy level.

Additionally or alternatively, a process can include training a classification model with the augmented training corpus and/or initiating/actually performing (by text classification software) text classification using such a trained classification mode.

Although various examples are provided, variations are possible without departing from a spirit of the claimed aspects.

Figure 11:
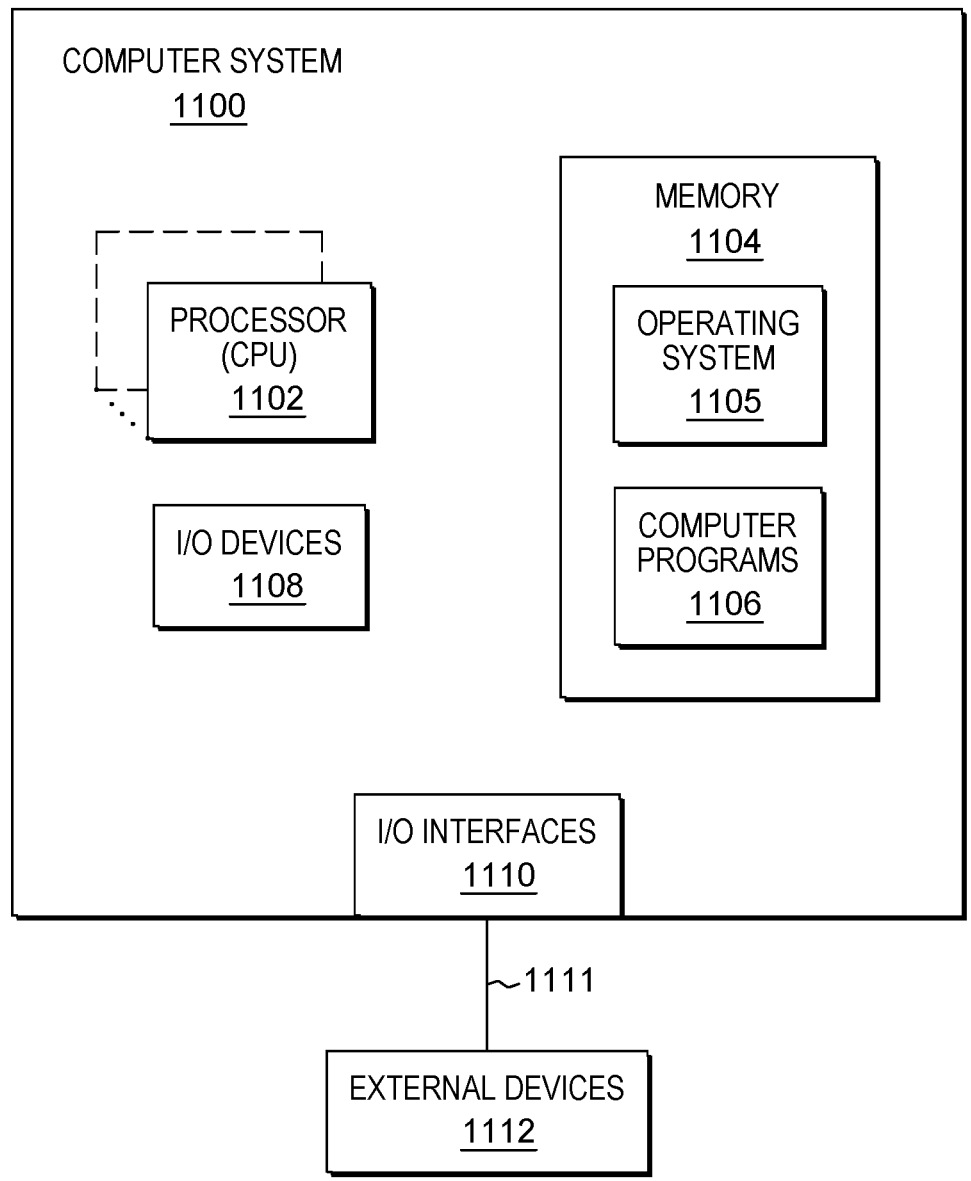
FIG. 11 depicts one example of a computer system and associated devices to incorporate and/or use aspects described herein.

Processes described herein may be performed singly or collectively by one or more computer systems, such as one or more computer systems described herein. FIG. 11 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 11 shows a computer system 1100 in communication with external device(s) 1112. Computer system 1100 includes one or more processor(s) 1102, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1102 can also include register(s) to be used by one or more of the functional components. Computer system 1100 also includes memory 1104, input/output (I/O) devices 1108, and I/O interfaces 1110, which may be coupled to processor(s) 1102 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1104 can be or include main or system memory (e.g. Random Access Memory) used in the execution of program instructions, storage device(s) such as hard drive(s), flash media, or optical media as examples, and/or cache memory, as examples. Memory 1104 can include, for instance, a cache, such as a shared cache, which may be coupled to local caches (examples include L1 cache, L2 cache, etc.) of processor(s) 1102. Additionally, memory 1104 may be or include at least one computer program product having a set (e.g., at least one) of program modules, instructions, code or the like that is/are configured to carry out functions of embodiments described herein when executed by one or more processors.

Memory 1104 can store an operating system 1105 and other computer programs 1106, such as one or more computer programs/applications that execute to perform aspects described herein. Specifically, programs/applications can include computer readable program instructions that may be configured to carry out functions of embodiments of aspects described herein.

Examples of I/O devices 1108 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1112) coupled to the computer system through one or more I/O interfaces 1110.

Computer system 1100 may communicate with one or more external devices 1112 via one or more I/O interfaces 1110. Example external devices include a keyboard, a pointing device, a display, and/or any other devices that enable a user to interact with computer system 1100. Other example external devices include any device that enables computer system 1100 to communicate with one or more other computing systems or peripheral devices such as a printer. A network interface/adapter is an example I/O interface that enables computer system 1100 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1110 and external devices 1112 can occur across wired and/or wireless communications link(s) 1111, such as Ethernet-based wired or wireless connections. Example wireless connections include cellular, Wi-Fi, Bluetooth®, proximity-based, near-field, or other types of wireless connections. More generally, communications link(s) 1111 may be any appropriate wireless and/or wired communication link(s) for communicating data.

Particular external device(s) 1112 may include one or more data storage devices, which may store one or more programs, one or more computer readable program instructions, and/or data, etc. Computer system 1100 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1100 may be operational with numerous other general purpose or special purpose computing system environments or configurations. Computer system 1100 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
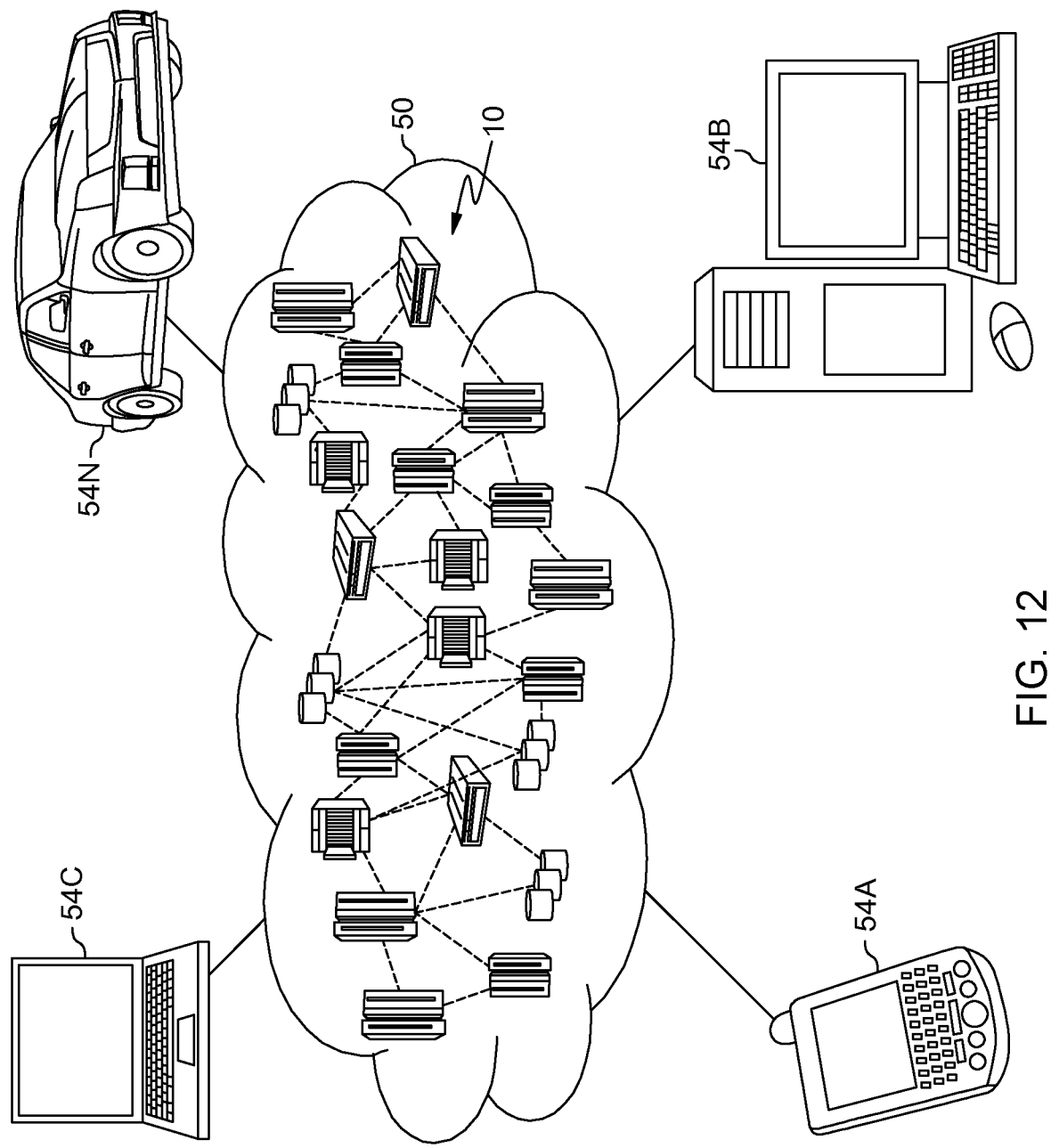
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
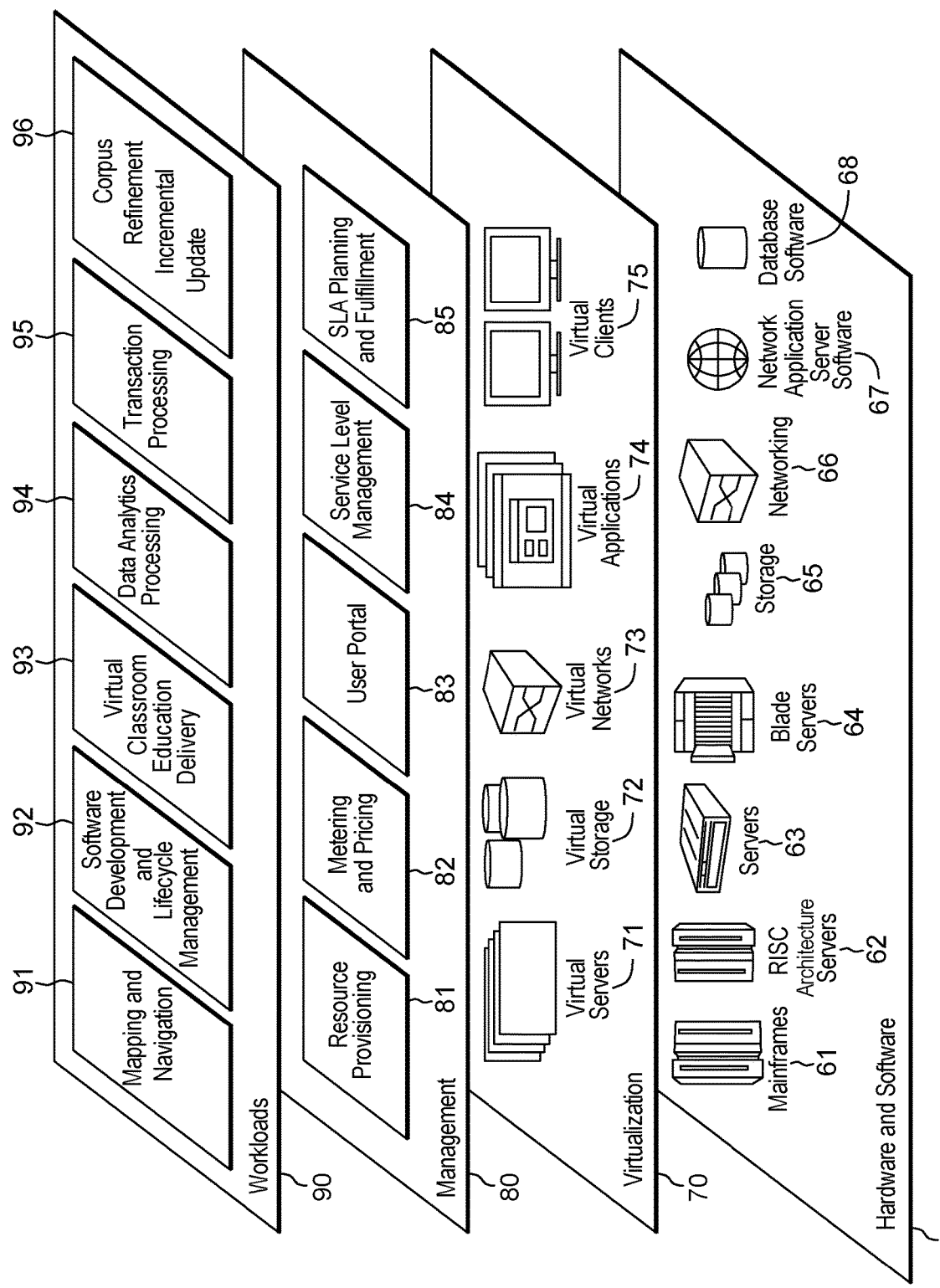
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and corpus refinement and incremental updating 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining a training corpus of data, the training corpus comprising a collection of training samples;
refining the obtained training corpus to produce a refined training corpus of data, wherein refining the obtained training corpus comprises applying to the obtained training corpus an overlap treatment and a noise reduction treatment, the overlap treatment and noise reduction treatment filtering out one or more samples of the collection of training samples;
maintaining an incremental intelligence database based on filtered user feedback, the incremental intelligence database storing candidate feedback training samples based on the filtered user feedback to augment the refined training corpus; and
controlling integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus, wherein the controlling integration selectively determines whether to include the candidate feedback training samples in the refined training corpus and comprises:
comparing a first determined accuracy, the first determined accuracy being the accuracy of classification performed based on training that includes the candidate feedback training samples as part of the refined training corpus, to a second determined accuracy, the second determined accuracy being the accuracy of classification performed based on training that does not include the candidate feedback training samples as part of the refined training corpus;
determining whether the first determined accuracy is greater than the second determined accuracy; and
based on determining that the first determined accuracy is greater than the second determined accuracy, augmenting the refined training corpus with at least some of the candidate feedback training samples to produce an augmented training corpus.

2. The method of claim 1, wherein the refining comprises:
establishing a plurality of corpus feature vectors representative of the collection of training samples;
building an entropy meter database, the building the entropy meter database comprising extracting and storing tokens from each corpus feature vector of the plurality of feature vectors based on a Term Frequency-Inverse Class Frequency (TFICF) weight;
performing the overlap treatment to identify one or more overlapping training samples;
performing the noise detection treatment to identify one or more noisy training samples; and
filtering out the one or more samples from the training corpus, the one or more samples filtered-out from the training corpus being at least one selected from the group consisting of the one or more overlapping samples and the one or more noisy samples, the filtering out being based on quality scoring and risk determination, wherein the filtering produces the refined training corpus.

3. The method of claim 2, wherein the establishing the plurality of corpus feature vectors comprises:
assigning each sample of the collection of training samples to a respective class of a plurality of corpus classes; and
based on the assigning, building a corpus feature vector for each class of the plurality of corpus classes, each feature vector comprising weighted TFICF tokens, and the built corpus feature vector being one corpus feature vector of the plurality of corpus feature vectors.

4. The method of claim 2, wherein the performing the overlap treatment comprises:
identifying overlapping corpus classes based on pair-wise comparisons of the plurality of feature vectors;
identifying overlapping tokens of the plurality of feature vectors;
obtaining a standard class-wise token database having class-specific dictionaries of standard keywords, phrases, and synonyms;
identifying the one or more overlapping training samples based on the overlapping corpus classes, overlapping tokens, and standard class-wise token database; and
storing the overlapping training samples for a recommendation engine to perform the filtering out.

5. The method of claim 2, wherein the performing the noise detection treatment comprises:
comparing tokens of the entropy meter database against tokens of the standard class-wise token database to identify anomalous tokens;
identifying, based on the comparing, corpus classes having one or more noisy tokens; and
storing, for a recommendation engine, indications of the noisy tokens and the identified corpus classes having one or more noisy tokens, to perform the filtering out.

6. The method of claim 1, wherein the maintaining comprises:
feeding the filtered user feedback into a reinforcement learning model; and
adding the candidate feedback training samples of the filtered feedback to the incremental intelligence database based on classifying feedback training samples of the filtered user feedback into feedback classes and on assessing intra-class and inter-class effects of the classified feedback training samples.

7. The method of claim 6, wherein the classifying the feedback training samples comprises assigning each sample of the feedback training samples to a respective class of the feedback classes, and, based on the assigning, building a feedback feature vector for each class of the feedback classes, and wherein the method further comprises:
establishing an overlap intensity threshold, a noise intensity threshold, and a class entropy threshold; and
for each pair of a respective feedback feature vector and respective corpus feature vector:
determining a respective entropy intersection value for the pair; and
performing processing based on whether the class of the feedback feature vector of the pair is a class represented in the training corpus.

8. The method of claim 7, wherein, based on the class of the feedback feature vector being a new class not represented in the training corpus, the method further comprises storing, in a new class/intent database, any sample of the feedback training samples classified to the feedback class for which the feedback feature vector is built, based on the entropy intersection parameter being less than the overlap intensity threshold and on the feedback feature vector passing a noise intensity check based on the noise intensity threshold.

9. The method of claim 8, wherein the method further comprises accumulating in the new class/intent database a plurality of feedback feature vectors having the new class, and, based on (i) accumulating a threshold number of samples classified in that new class and on (ii) identifying a pattern among those samples, forwarding the accumulated samples to the incremental intelligence storage database as at least some of the candidate feedback training samples.

10. The method of claim 7, wherein, based on the class of the feedback feature vector being represented in the training corpus, the method further comprises determining whether to add samples classified into the class of the feedback feature vector to the incremental intelligence storage database, the determining being based at least in part on the overlap intensity threshold, noise intensity threshold, and class entropy threshold, and whether the class of the corpus feature vector of the pair matches the feedback class of the feedback feature vector.

11. The method of claim 1, further comprising building a filtered feedback database for the filtered feedback, the building the filtered feedback database comprising determining class-wise accuracy based on numbers of hit cases, missed cases, false-positive cases, and rejected cases as reported in the user feedback, and storing to the filtered feedback database feedback training samples for failed classes for which class-wise accuracy is above a threshold class accuracy level.

12. The method of claim 1, wherein the maintaining comprises continually updating the incremental intelligence database based on additional filtered user feedback to produce updated candidate feedback training samples, and wherein the method further comprises repeating the controlling integration and the augmenting using the updated candidate feedback training samples.

13. The method of claim 1, further comprising training a classification model with the augmented training corpus.

14. A computer program product comprising:
a computer readable storage medium readable by a processing circuit and storing instructions for execution by the processing circuit for performing a method comprising:
obtaining a training corpus of data, the training corpus comprising a collection of training samples;
refining the obtained training corpus to produce a refined training corpus of data, wherein refining the obtained training corpus comprises applying to the obtained training corpus an overlap treatment and a noise reduction treatment, the overlap treatment and noise reduction treatment filtering out one or more samples of the collection of training samples;
maintaining an incremental intelligence database based on filtered user feedback, the incremental intelligence database storing candidate feedback training samples based on the filtered user feedback to augment the refined training corpus; and
controlling integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus, wherein the controlling integration selectively determines whether to include the candidate feedback training samples in the refined training corpus and comprises:
comparing a first determined accuracy, the first determined accuracy being the accuracy of classification performed based on training that includes the candidate feedback training samples as part of the refined training corpus, to a second determined accuracy, the second determined accuracy being the accuracy of classification performed based on training that does not include the candidate feedback training samples as part of the refined training corpus;
determining whether the first determined accuracy is greater than the second determined accuracy; and
based on determining that the first determined accuracy is greater than the second determined accuracy, augmenting the refined training corpus with at least some of the candidate feedback training samples to produce an augmented training corpus.

15. The computer program product of claim 14, wherein the refining comprises:
- establishing a plurality of corpus feature vectors representative of the collection of training samples, wherein the establishing the plurality of corpus feature vectors comprises:
  - assigning each sample of the collection of training samples to a respective class of a plurality of corpus classes; and
  - based on the assigning, building a corpus feature vector for each class of the plurality of corpus classes, each feature vector comprising weighted TFICF tokens, and the built corpus feature vector being one corpus feature vector of the plurality of corpus feature vectors;
- building an entropy meter database, the building the entropy meter database comprising extracting and storing tokens from each corpus feature vector of the plurality of feature vectors based on a Term Frequency-Inverse Class Frequency (TFICF) weight;
- performing the overlap treatment to identify one or more overlapping training samples, wherein the performing the overlap treatment comprises:
  - identifying overlapping corpus classes based on pair-wise comparisons of the plurality of feature vectors;
  - identifying overlapping tokens of the plurality of feature vectors;
  - obtaining a standard class-wise token database having class-specific dictionaries of standard keywords, phrases, and synonyms;
  - identifying the one or more overlapping training samples based on the overlapping corpus classes, overlapping tokens, and standard class-wise token database; and
  - storing the overlapping training samples for a recommendation engine to perform the filtering out;
- performing the noise detection treatment to identify one or more noisy training samples, wherein the performing the noise detection treatment comprises:
  - comparing tokens of the entropy meter database against tokens of the standard class-wise token database to identify anomalous tokens;
  - identifying, based on the comparing, corpus classes having one or more noisy tokens; and
  - storing, for a recommendation engine, indications of the noisy tokens and the identified corpus classes having one or more noisy tokens, to perform the filtering out; and
- filtering out the one or more samples from the training corpus, the one or more samples filtered-out from the training corpus being at least one selected from the group consisting of the one or more overlapping samples and the one or more noisy samples, the filtering out being based on quality scoring and risk determination, wherein the filtering produces the refined training corpus.

16. The computer program product of claim 14, wherein the maintaining comprises:
- feeding the filtered user feedback into a reinforcement learning model; and
- adding the candidate feedback training samples of the filtered feedback to the incremental intelligence database based on classifying feedback training samples of the filtered user feedback into feedback classes and on assessing intra-class and inter-class effects of the classified feedback training samples, wherein the classifying the feedback training samples comprises assigning each sample of the feedback training samples to a respective class of the feedback classes, and, based on the assigning, building a feedback feature vector for each class of the feedback classes, and wherein the method further comprises:
  - establishing an overlap intensity threshold, a noise intensity threshold, and a class entropy threshold; and
  - for each pair of a respective feedback feature vector and respective corpus feature vector:
    - determining a respective entropy intersection value for the pair; and
    - performing processing based on whether the class of the feedback feature vector of the pair is a class represented in the training corpus, wherein:
      - based on the class of the feedback feature vector being a new class not represented in the training corpus, the method further comprises:
        - storing, in a new class/intent database, any sample of the feedback training samples classified to the feedback class for which the feedback feature vector is built, based on the entropy intersection parameter being less than the overlap intensity threshold and on the feedback feature vector passing a noise intensity check based on the noise intensity threshold;
        - accumulating in the new class/intent database a plurality of feedback feature vectors having the new class; and
        - based on (i) accumulating a threshold number of samples classified in that new class and on (ii) identifying a pattern among those samples, forwarding the accumulated samples to the incremental intelligence storage database as at least some of the candidate feedback training samples; and
      - based on the class of the feedback feature vector being represented in the training corpus, the method further comprises:
        - determining whether to add samples classified into the class of the feedback feature vector to the incremental intelligence storage database, the determining being based at least in part on the overlap intensity threshold, noise intensity threshold, and class entropy threshold, and whether the class of the corpus feature vector of the pair matches the feedback class of the feedback feature vector.

17. The computer program product of claim 14, wherein the method further comprises building a filtered feedback database for the filtered feedback, the building the filtered feedback database comprising determining class-wise accuracy based on numbers of hit cases, missed cases, false-positive cases, and rejected cases as reported in the user feedback, and storing to the filtered feedback database feedback training samples for failed classes for which class-wise accuracy is above a threshold class accuracy level.

18. A computer system comprising:
- a memory; and
- a processor in communication with the memory, wherein the computer system is configured to perform a method comprising:
  - obtaining a training corpus of data, the training corpus comprising a collection of training samples;
  - refining the obtained training corpus to produce a refined training corpus of data, wherein refining the obtained training corpus comprises applying to the obtained training corpus an overlap treatment and a noise reduction treatment, the overlap treatment and noise reduction treatment filtering out one or more samples of the collection of training samples;

maintaining an incremental intelligence database based on filtered user feedback, the incremental intelligence database storing candidate feedback training samples based on the filtered user feedback to augment the refined training corpus; and controlling integration of the candidate feedback training samples with the refined training corpus, the controlling being based at least in part on whether accuracy of classification performed based on training that includes the candidate feedback training samples as part of the refined training corpus is greater than accuracy of classification performed based on training that does not include the candidate feedback training samples as part of the refined training corpus, wherein the controlling integration selectively determines whether to include the candidate feedback training samples to the refined training corpus and comprises:

comparing a first determined accuracy, the first determined accuracy being the accuracy of classification performed based on training that includes the candidate feedback training samples as part of the refined training corpus, to a second determined accuracy, the second determined accuracy being the accuracy of classification performed based on training that does not include the candidate feedback training samples as part of the refined training corpus;

determining whether the first determined accuracy is greater than the second determined accuracy; and based on determining that the first determined accuracy is greater than the second determined accuracy, augmenting the refined training corpus with at least some of the candidate feedback training samples to produce an augmented training corpus.

19. The computer system of claim 18, wherein the refining comprises:

establishing a plurality of corpus feature vectors representative of the collection of training samples, wherein the establishing the plurality of corpus feature vectors comprises:

assigning each sample of the collection of training samples to a respective class of a plurality of corpus classes; and based on the assigning, building a corpus feature vector for each class of the plurality of corpus classes, each feature vector comprising weighted TFICF tokens, and the built corpus feature vector being one corpus feature vector of the plurality of corpus feature vectors;

building an entropy meter database, the building the entropy meter database comprising extracting and storing tokens from each corpus feature vector of the plurality of feature vectors based on a Term Frequency-Inverse Class Frequency (TFICF) weight;

performing the overlap treatment to identify one or more overlapping training samples, wherein the performing the overlap treatment comprises:

identifying overlapping corpus classes based on pair-wise comparisons of the plurality of feature vectors;

identifying overlapping tokens of the plurality of feature vectors;

obtaining a standard class-wise token database having class-specific dictionaries of standard keywords, phrases, and synonyms;

identifying the one or more overlapping training samples based on the overlapping corpus classes, overlapping tokens, and standard class-wise token database; and storing the overlapping training samples for a recommendation engine to perform the filtering out;

performing the noise detection treatment to identify one or more noisy training samples, wherein the performing the noise detection treatment comprises:

comparing tokens of the entropy meter database against tokens of the standard class-wise token database to identify anomalous tokens;

identifying, based on the comparing, corpus classes having one or more noisy tokens; and storing, as the one or more noisy training samples, those training samples in which the identified noisy tokens appear, for a recommendation engine to perform the filtering out; and filtering out the one or more samples from the training corpus, the one or more samples filtered-out from the training corpus being at least one selected from the group consisting of the one or more overlapping samples and the one or more noisy samples, the filtering out being based on quality scoring and risk determination, wherein the filtering produces the refined training corpus.

20. The computer system of claim 18, wherein the maintaining comprises:

feeding the filtered user feedback into a reinforcement learning model; and adding the candidate feedback training samples of the filtered feedback to the incremental intelligence database based on classifying feedback training samples of the filtered user feedback into feedback classes and on assessing intra-class and inter-class effects of the classified feedback training samples, wherein the classifying the feedback training samples comprises assigning each sample of the feedback training samples to a respective class of the feedback classes, and, based on the assigning, building a feedback feature vector for each class of the feedback classes, and wherein the method further comprises:

establishing an overlap intensity threshold, a noise intensity threshold, and a class entropy threshold; and for each pair of a respective feedback feature vector and respective corpus feature vector:

determining a respective entropy intersection value for the pair; and performing processing based on whether the class of the feedback feature vector of the pair is a class represented in the training corpus, wherein:

based on the class of the feedback feature vector being a new class not represented in the training corpus, the method further comprises:

storing, in a new class/intent database, any sample of the feedback training samples classified to the feedback class for which the feedback feature vector is built, based on the entropy intersection parameter being less than the overlap intensity threshold and on the feedback feature vector passing a noise intensity check based on the noise intensity threshold;

accumulating in the new class/intent database a plurality of feedback feature vectors having the new class; and based on (i) accumulating a threshold number of samples classified in that new class and on (ii) identifying a pattern among those samples, forwarding the accumulated samples to the incremental intelligence storage database as at least some of the candidate feedback training samples; and based on the class of the feedback feature vector being represented in the training corpus, the method further comprises determining whether to add samples classified into the class of the feedback feature vector to the incremental intelligence storage database, the determining being based at least in part on the overlap intensity threshold, noise intensity threshold, and class entropy threshold, and whether the class of the corpus feature vector of the pair matches the feedback class of the feedback feature vector.

\* \* \* \* \*